(12) United States Patent
Horiguchi et al.

(10) Patent No.: US 6,282,507 B1
(45) Date of Patent: Aug. 28, 2001

(54) METHOD AND APPARATUS FOR INTERACTIVE SOURCE LANGUAGE EXPRESSION RECOGNITION AND ALTERNATIVE HYPOTHESIS PRESENTATION AND SELECTION

(75) Inventors: Keiko Horiguchi; Alexander M. Franz, both of Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/240,230

(22) Filed: Jan. 29, 1999

(51) Int. Cl.⁷ .............. G06F 17/28; G10L 15/18; G10L 21/00

(52) U.S. Cl. .............. 704/3; 704/257; 704/277; 345/171

(58) Field of Search .............. 704/2, 3, 4, 5, 704/6, 7, 8, 9, 10, 277, 251, 252, 255, 257; 345/171, 173; 707/536

(56) References Cited

U.S. PATENT DOCUMENTS

| | | | |
|---|---|---|---|
| 4,592,085 | 5/1986 | Watari et al. | 704/255 |
| 4,686,332 | 8/1987 | Greenias et al. | 345/173 |
| 4,882,681 | 11/1989 | Brotz | 704/3 |
| 4,974,191 | 11/1990 | Amirghodsi et al. | 704/8 |
| 4,984,177 | 1/1991 | Rondel et al. | 704/277 |
| 4,984,178 | 1/1991 | Hemphill et al. | 704/255 |
| 5,003,601 | 3/1991 | Watari et al. | 382/209 |

(List continued on next page.)

FOREIGN PATENT DOCUMENTS

| | | |
|---|---|---|
| 0 525 470 A2 | 2/1993 | (EP) . |
| 0 736 857 A2 | 10/1996 | (EP) . |
| 0 774 729 A2 | 11/1996 | (EP) . |
| 0 751 467 A2 | 1/1997 | (EP) . |
| 0805403A2 | 5/1997 | (EP) . |
| 0 862 161 A2 | 2/1998 | (EP) . |
| 0 892 353 A2 | 7/1998 | (EP) . |
| 0 913 809 A2 | 8/1998 | (EP) . |

OTHER PUBLICATIONS

Hitashi Iida., "Spoken–Language Translation Method Using Examples", ATR Interpreting Telecommunications Research Laboratories, Proc. Of COLING–96, Copenhagen, Denmark, Aug. 1996, 4 pgs.

Hideo Watanabe, "A Simularity–Driven Transfer System", Proc. of COLING–92, Nantes, Aug. 23–28, 1992, pp. 770–776.

Koichi Takeda, "Pattern–Based Machine Translation", Tokyo Research Laboratory, IBM Research, 4 pgs.

W. John Hutchins, et al., "An Introduction to Machine Translation", Academic Press, London, 1992, p. 21–52.

Sobashima, et al., "A Bidirectional, Transfer Driven Machine Translation System for Spoken Dialogues", ATR Interpreting Telecommunications Research Laboratories, Proc. Od COLING 94, Kyoto, Japan, 1994, pp. 64–68.

(List continued on next page.)

*Primary Examiner*—Joseph Thomas
(74) *Attorney, Agent, or Firm*—Blakely, Sokoloff, Taylor & Zafman LLP

(57) ABSTRACT

In a language translation system, a method for providing a guide for a user. In one embodiment, the method comprises the steps of receiving an input that is representative of at least one word in a source language, and generating at least one recognition hypothesis in the source language in response to the input. The method further comprise the steps of selecting a best hypothesis from the at least one recognition hypothesis in the source language, presenting the best hypothesis in the source language to a user, and presenting alternatives to a portion of the best hypothesis in the source language to the user. The method further includes receiving an indication of a choice of one of the alternatives from the user, and presenting a revised version of the best hypothesis including the alternative chosen to the user.

39 Claims, 27 Drawing Sheets

U.S. PATENT DOCUMENTS

| | | | |
|---|---|---|---|
| 5,093,899 | 3/1992 | Hiraiwa | 706/25 |
| 5,095,432 | 3/1992 | Reed | 704/9 |
| 5,111,398 | 5/1992 | Nunberg et al. | 704/9 |
| 5,267,345 | 11/1993 | Brown et al. | 704/255 |
| 5,301,257 | 4/1994 | Tani | 706/20 |
| 5,335,261 | 8/1994 | Fujinaka | 455/563 |
| 5,337,232 | 8/1994 | Sakai et al. | 704/9 |
| 5,353,376 | 10/1994 | Oh et al. | 709/203 |
| 5,355,432 | 10/1994 | Tanaka et al. | 704/234 |
| 5,390,280 | 2/1995 | Kato et al. | 704/233 |
| 5,418,717 | 5/1995 | Su et al. | 704/9 |
| 5,426,583 | 6/1995 | Uribe-Echebarria Diaz De Mendibil | 704/2 |
| 5,444,617 | 8/1995 | Merialdo | 704/9 |
| 5,469,512 | 11/1995 | Fujita et al. | 382/118 |
| 5,500,920 * | 3/1996 | Kupiec | 704/270 |
| 5,503,560 | 4/1996 | Stentiford | 434/167 |
| 5,510,981 | 4/1996 | Berger et al. | 704/2 |
| 5,546,500 | 8/1996 | Lyberg | 704/277 |
| 5,546,538 | 8/1996 | Cobbley et al. | 704/233 |
| 5,560,037 | 9/1996 | Kaplan | 707/533 |
| 5,561,722 | 10/1996 | Watari et al. | 382/209 |
| 5,566,271 | 10/1996 | Tomitsuka et al. | 704/275 |
| 5,583,965 | 12/1996 | Douma et al. | 704/275 |
| 5,659,765 | 8/1997 | Nii | 704/4 |
| 5,677,835 | 10/1997 | Carbonell et al. | 704/8 |
| 5,748,841 | 5/1998 | Morin et al. | 704/257 |
| 5,768,603 * | 6/1998 | Brown et al. | 704/9 |
| 5,822,593 | 10/1998 | Lamping et al. | 717/9 |
| 5,845,245 | 12/1998 | Gupta et al. | 704/231 |
| 5,848,389 | 12/1998 | Asano et al. | 704/239 |
| 5,864,788 * | 1/1999 | Kutsumi | 704/2 |
| 5,884,083 | 3/1999 | Royce et al. | 717/5 |
| 5,884,246 | 3/1999 | Boucher et al. | 704/2 |
| 5,884,247 | 3/1999 | Christy | 704/7 |
| 5,907,821 | 5/1999 | Kaji et al. | 704/4 |
| 5,956,668 | 9/1999 | Alshawi et al. | 704/2 |
| 5,960,384 | 9/1999 | Brash | 704/9 |
| 5,963,892 | 10/1999 | Tanaka et al. | 704/2 |
| 5,983,179 | 11/1999 | Gould | 704/270.1 |
| 5,991,721 | 11/1999 | Asano et al. | 704/257 |
| 5,995,920 | 11/1999 | Carbonell et al. | 704/9 |
| 5,995,935 | 11/1999 | Hagiwara et al. | 704/272 |
| 6,085,162 | 7/2000 | Cherny | 704/277 |
| 6,092,038 * | 6/2000 | Kanevsky et al. | 704/9 |
| 6,161,083 | 12/2000 | Franz et al. | 704/4 |

OTHER PUBLICATIONS

Watanabe, et al., "Transfer System Using Example–Based Approach", IEICE Trans. Inf. & Syst., vol. E77–D, No. 2, Feb. 1994, pp. 247–257.

Document No. 08–111442, May 2, 1996 and Document No. 09–046140, Feb. 28, 1997, 1 page combined.

Masaru Tomita, et al., "The Generalized LR Parser/Compiler, Version 8.1: User's Guide", CMU–CMT–88–MEMO Apr. 20, 1988, 48 pgs.

Ishii, et al., "An Efficient Parser Generator for natural Language", Proc. Of CLOING–94, Kyoto, Japan, 1194, pp. 417–421.

Batliner, et al., "M=Syntx+Prosodic Labelling Scheme for Large Spontaneous Speech Databases", pp. 193–222.

Bateman, et al., "Selective Information Presentation in an Intergrated Publication System: An Application of Genre-–Driven Text Generation", pp. 753–767.

Duff, et al., "An Architecture For Spoken Dialogue Management", pp. 1025–1028.

Franz, et al., "Grades of Specificity in Example–Based Speech Translation", Spoken Language Technology, Sony US Research Laboratories, 2 pgs.

Maruyama, et al., "Tree Cover Search Algorithm for Example–Based Translation", TMI–92, pp. 173–184.

Oerder, et al., "Word Graphs: An Efficient interface Between Continuous Speech Recognition and Language Understanding", 0–7803–0946–4/93, 1993 IEEE, p. II–119–II–122.

Bahl, et al., "A Maximum Likelihood Approach to Continuous Speech Recognition", 0162–8828/83/0300–0179, p. 308–319.

Tomita, See–Kiong Ng, "Generalized LR Parsing", M. Tornita (ed.), Klawen Academic Publishers, 1991, pp. 1–16.

Kimmo Koskenniemi, "Two–Level Morphology: A General Computational Model for Word–Form Recognition and Production", ISBN 951–45–3201–5, ISSN 0355–7170, 183, pp. 1–160.

Gazdar, et al., "Finite State Morphology, A Review of Koskenniemi (1983)", Center for the Study of Language and Info., Report No. CSLI–85–32, Sep. 1985, 10 pgs.

Cranias, et al., "Clustering: A Technique for Search Space Reduction in Example–Based Machine Translation", Proceedings of the International Conference on Systems, Man, and Cybernetics, 1994, pp. 1–6.

Higuchi, et al., "The IXM2 Parallel Associative Processor for AI Computerp", vol. 27, No. 11, Nov. 1994.

* cited by examiner

| Inflection Type | Feature to trigger Generator or for Analyzer to create |
|---|---|
| past-tense form of verbs | (VFORM PAST) |
| past participle form of verbs | (VFORM PAST-PART) |
| present participle form of verbs | (VFORM PRES-PART) |
| present-tense form of verbs | (VFORM PRES) |
| present-tense 1st person singular form of verbs | (VFORM PRES)(PERSON 1)(NUM SING) |
| present- tense 3rd-person singular form of verbs | (VFORM PRES)(PERSON 3)(NUM SING) |
| past-tense 1st-person singular form of verbs | (VFORM PAST)(PERSON 1)(NUM SING) |
| past-tense 3rd person singular form of verbs | (VFORM PAST)(PERSON 3)(NUM SING) |
| comparative form of adjectives/adverbs | (AFORM COMP) |
| superlative form of adjectives/adverbs | (AFORM SUPER) |
| adverbial form of adjectives | (ADVERBIAL +) |
| plural form of nouns | (NUM PLURAL) |
| genitive form of nouns | (CASE GEN) |

| Feature-Value Pair | Inflection Rules Applicable | Examples | Notes |
|---|---|---|---|
| CONS-DBL+ | present-participle (VERB), past-tense (VERB), past participle (VERB), comparative (ADJ/ADV), superlative (ADJ/ADV) | "running", "submitted", "bigger" | Double final consonant and apply appropriate default rule. If the final consonant is "k", charge it into "ck" instead Of "kk". |
| Y-TO-I+ | past-tense (VERB), past-participle (VERB), present-tense 3rd-person singular (VERB), plural (NOUN)< comparative (ADJ/ADV), superlative (ADJ/ADV) | "studied", "studies", "candies", "tidier", "tidiest" | Charge the final "y" to "i" and apply appropriate default rule. |
| F-TO-V+ | plural (NOUN) | "leaves", "thieves" | Charge the final "f" to "v" and apply appropriate default rule. |
| FE-TO-VE+ | plural (NOUN) | "knives", "wives" | Charge the final "fe" to "ve" and apply appropriate default rule. |
| AD-INFL+ | comparative (ADJ/ADV), superlative (ADJ/ADV) | "faster", "fastest" | Generate inflected forms only if this feature exists. Otherwise, use "more"/"most" instead. |
| NO-COMP-SUPER+ | comparative (ADJ/ADV), superlative (ADJ/ADV) | "right", "wrong" | Do not form a comparative or superlative if this feature exists. |
| ADJ-TO-ADV+ | adverbial (ADJ) | "kindly", "greatly" | Generate adverbial form only if this feature exists. |
| ZERO-PLURAL+ | plural (NOUN) | "love" | Do not form a plural if this feature exists |
| ZERO-SING+ | plural (NOUN) | "trousers" | Always treat the word as plural. Do not use a singular determiner, etc. |

Fig. 24

METHOD AND APPARATUS FOR INTERACTIVE SOURCE LANGUAGE EXPRESSION RECOGNITION AND ALTERNATIVE HYPOTHESIS PRESENTATION AND SELECTION

FIELD OF THE INVENTION

This invention relates to speech or voice translation systems. More particularly, this invention relates to a spoken language translation system that performs speech-to-speech translation.

BACKGROUND

Speech is the predominant mode of human communication because it is very efficient and convenient. Certainly, written language is very important, and much of the knowledge that is passed from generation to generation is in written form, but speech is a preferred mode for everyday interaction. Consequently, spoken language is typically the most natural, most efficient, and most expressive means of communicating information, intentions, and wishes. Speakers of different languages, however, face a formidable problem in that they cannot effectively communicate in the face of their language barrier. This poses a real problem in today's world because of the ease and frequency of travel between countries. Furthermore, the global economy brings together business people of all nationalities in the execution of multinational business dealings, a forum requiring efficient and accurate communication. As a result, a need has developed for a machine-aided interpersonal communication system that accepts natural fluent speech input one language and provides an accurate near real-time output comprising natural fluent speech in another language. This system would relieve users of the need to possess specialized linguistic or translational knowledge. Furthermore, there is a need for the machine-aided interpersonal communication system to be portable so that the user can easily transport it.

A typical language translation system functions by using natural language processing. Natural language processing is generally concerned with the attempt to recognize a large pattern or sentence by decomposing it into small subpatterns according to linguistic rules. Until recently, however, natural language processing systems have not been accurate or fast enough to support useful applications in the field of language translation, particularly in the field of spoken language translation.

While the same basic techniques for parsing, semantic interpretation, and contextual interpretation may be used for spoken or written language, there are some significant differences that affect system design. For instance, with spoken input the system has to deal with uncertainty. In written language the system knows exactly what words are to be processed. With spoken language it only has a guess at what was said. In addition, spoken language is structurally quite different than written language. In fact, sometimes a transcript of perfectly understandable speech is not comprehensible when read. Spoken language occurs a phrase at a time, and contains considerable intonational information that is not captured in written form. It also contains many repairs, in which the speaker corrects or rephrases something that was just said. In addition, spoken dialogue has a rich interaction of acknowledgment and confirmation that maintains the conversation, which does not appear in written forms.

The basic architecture of a typical spoken language translation or natural language processing system processes sounds produced by a speaker by converting them into digital form using an analog-to-digital converter. This signal is then processed to extract various features, such as the intensity of sound at different frequencies and the change in intensity over time. These features serve as the input to a speech recognition system, which generally uses Hidden Markov Model (HMM) techniques to identify the most likely sequence of words that could have produced the speech signal. The speech recognizer then outputs the most likely sequence of words to serve as input to a natural language processing system. When the natural language processing system needs to generate an utterance, it passes a sentence to a module that translates the words into phonemic sequence and determines an intonational contour, and then passes this information on to a speech synthesis system, which produces the spoken output.

A natural language processing system uses considerable knowledge about the structure of the language, including what the words are, how words combine to form sentences, what the words mean, and how word meanings contribute to sentence meanings. However, linguistic behavior cannot be completely accounted for without also taking into account another aspect of what makes humans intelligent-their general world knowledge and their reasoning abilities. For example, to answer questions or to participate in a conversation, a person not only must have knowledge about the structure of the language being used, but also must know about the world in general and the conversational setting in particular.

The different forms of knowledge relevant for natural language processing comprise phonetic and phonological knowledge, morphological knowledge, syntactic knowledge, semantic knowledge, and pragmatic knowledge. Phonetic and phonological knowledge concerns how words are related to the sounds that realize them. Such knowledge is crucial for speech based systems. Morphological knowledge concerns how words are constructed from more basic units called morphemes. A morpheme is the primitive unit in a language, for example, the word friendly is derivable from the meaning of the noun friend and the suffix -ly, which transforms a noun into an adjective.

Syntactic knowledge concerns how words can be put together to form correct sentences and determines what structural role each word plays in the sentence and what phrases are subparts of what other phrases. Typical syntactic representations of language are based on the notion of context-free grammars, which represent sentence structure in terms of what phrases are subparts of other phrases. This syntactic information is often presented in a tree form.

Semantic knowledge concerns what words mean and how these meanings combine in sentences to form sentence meanings. This is the study of context-independent meaning—the meaning a sentence has regardless of the context in which it is used. The representation of the context-independent meaning of a sentence is called its logical form. The logical form encodes possible word senses and identifies the semantic relationships between the words and phrases.

Natural language processing systems further comprise interpretation processes that map from one representation to the other. For instance, the process that maps a sentence to its syntactic structure and logical form is called parsing, and it is performed by a component called a parser. The parser uses knowledge about word and word meaning, the lexicon, and a set of rules defining the legal structures, the grammar, in order to assign a syntactic structure and a logical form to an input sentence. Formally, a context-free grammar of a language is a four-tuple comprising nonterminal vocabularies, terminal vocabularies, a finite set of production rules, and a starting symbol for all productions. The nonterminal and terminal vocabularies are disjoint. The set of terminal symbols is called the vocabulary of the language. Pragmatic knowledge concerns how sentences are used in different situations and how use affects the interpretation of the sentence.

The typical natural language processor, however, has realized only limited success because these processors operate only within a narrow framework. A natural language processor receives an input sentence, lexically separates the words in the sentence, syntactically determines the types of words, semantically understands the words, pragmatically determines the type of response to generate, and generates the response. The natural language processor employs many types of knowledge and stores different types of knowledge in different knowledge structures that separate the knowledge into organized types. A typical natural language processor also uses very complex capabilities. The knowledge and capabilities of the typical natural language processor must be reduced in complexity and refined to make the natural language processor manageable and useful because a natural language processor must have more than a reasonably correct response to an input sentence.

Identified problems with previous approaches to natural language processing are numerous and involve many components of the typical speech translation system. Regarding the spoken language translation system, one previous approach combines the syntactic rules for analysis together with the transfer patterns or transfer rules. As a result, the syntactic rules and the transfer rules become interdependent, and the system becomes less modular and difficult to extend in coverage or apply to a new translation domain.

Another previous approach to natural language processing combines the syntactic analysis rules with domain-specific semantic analysis rules and also adds examples as annotations to those rules. During analysis using this system, the example annotations assist in the selection of the analysis rule that should be applied. This approach suffers from the same lack of modularity and inter-dependence as the previous approach.

Still another previous approach to natural language translation performs a dependency analysis first, and then performs an example-based transfer. This approach improves upon modularity, but dependency analysis is not powerful enough to handle a wide range of linguistic expressions, as dependency analysis merely takes the words in the input and arranges them in a dependency graph in order to show which word linguistically depends on another word. This previous approach does not perform analysis and generation that is in-depth enough and detailed enough for high-quality translation across a wide range of spoken expressions that occur in natural dialogue.

Problems are also prevalent in previous approaches to performing syntactic analysis in example-based translation systems. One previous approach performs dependency analysis to obtain surface word dependency graphs for the input and the examples of the example database. The problem, however, with this approach is that dependency grammar lacks the expressiveness required for many common spoken language constructions.

Another previous approach to performing syntactic analysis in example-based translation systems used in a transfer-based machine translation system performs constituent transfer using a combined syntactic-semantic grammar that is annotated with examples. Similarly, a pattern-based machine translation system uses a context-free grammar that combines syntactic rules with translation patterns.

Combined syntactic-semantic grammars such as used in transfer-based machine translation systems and the pattern-based machine translation systems make knowledge acquisition and maintenance very difficult, since syntactic analysis and analogical transfer rules become heavily interdependent. Furthermore, even a context-free grammar with feature constraints is not expressive enough. Moreover, some light-verb and copula constructions cannot be handled without the power to exchange feature values between the verb and its object.

Still another previous approach to performing syntactic analysis in example-based translation systems is to separate syntactic analysis from example-based transfer, and perform dependency analysis on both the input string and the example data. This separation helps keep knowledge acquisition and maintenance simple, but dependency analysis is far less powerful for taking advantage of syntactic regularities found in natural language.

Example-based translation is a method for translation that uses bilingual example pairs to encode translation correspondences or translation knowledge. An example-based translation system uses an example database, a stored set of corresponding words, phrases, expressions, or sentences in the source and target languages. The typical example-based system performs the following steps: accepts input in the source language; matches the input to the source expressions of the example pairs in the example database, and finds the most appropriate example or examples; takes the target expressions from the best-matching examples and constructs an expression in the target language; and outputs the target language translation.

A previous approach to solving the problem or performing example-based translation with examples having different degrees of specificity performs the following steps: perform dependency analysis on the example pairs in the example database; perform dependency analysis on the input expression; select a set of example fragments that completely covers the input; construct the target expression using the target fragments corresponding to the selected source fragments; and, output the target language translation.

There are a number of problems with this previous approach. First, dependency analysis is not detailed enough to account for many natural language expressions as the matching is essentially performed on the words in the input. Second, this approach is limited to using examples that all have the same degree of linguistic specificity. That is, there is no way to use translation knowledge that ranges from the very general and abstract to the very precise and specific. The third problem with this approach is that for a match to be found, all arcs in the dependency tree are required to be matched. This means that it is not possible to delete or insert words. This kind of precise match is not useful for translating spoken language. The translation component in a spoken language translation system has to be able to handle input that has incorrectly added/deleted/substituted words because of mistakes in the speech recognizer. In addition, natural speech of people is not perfectly complete and grammatical—it also includes repeated words, omissions, and incomplete sentences.

English morphology is a relatively well understood linguistic phenomenon, but its computational treatment in natural language processing and the design and integration of a morphological analyzer with other components of a system can be performed using one of two previous approaches. The approach used depends on the envisioned application and efficiency considerations. The previous alternatives include not performing morphological analysis, and using two-level morphological analysis.

If no morphological analyzer is used in natural language processing applications, the only alternative for handling morphology is via a full-form dictionary, or a dictionary that contains each and every word inflection that can constitute an input as a separate dictionary entry (e.g. "walk"; "walks"; "walked"; "walking"... all have to be listed). The problem with this approach is that the system is required to have a large amount of memory to accommodate the dictionary and, because of the access time required, the language processing is inefficient.

Typical two-level morphological analyzers apply an array of morphological rules in parallel, with the rules being compiled into a Finite-State Transducer (FST) that relates the two levels. The problem with this analysis is that, while it allows for descriptions of a range of languages with more complicated morphology than English, it has the disadvantages of two-level morphology, notably slow processing speed, notational complexity, and the problem that correct analysis is possible only if the FST makes its way to the end.

A Generalized Left-to-Right (Generalized LR or GLR) parsing algorithm was developed as an extension of the Left-to-Right (LR) parsing algorithm to provide for efficient parsing of natural language. The graph-structured stack was also introduced for handling ambiguities in natural language. All the possible parse trees are stored in a data structure called the packed parse forest. The run-time parser is driven by a table that is pre-generated by a compiler that accepts context-free grammars.

One previous GLR parser supports grammatical specifications that consist of context-free grammar rules bundled with feature structure constraints. Feature structure manipulation is performed during parsing, and the result of parsing an input sentence consists of both a context-free parse tree and feature structure representations associated with the nodes in the parse tree. The problem with this parser is that it is implemented in List Processing (LISP), which is not efficient for practical use. Furthermore, its feature structure manipulations allow only unique slot-names, which is not suitable for shallow syntactic analysis where multiple slots are routinely needed. In addition, its local ambiguity packing procedure may cause incorrect results when implemented with feature structure manipulation.

Another previous GLR parser accepts arbitrary context-free grammar rules and semantic actions. It uses the GLR algorithm as its parsing engine, but handles semantic actions by separating them into two sets: a first set, intended for simple disambiguation instructions, which is executed during the parsing process; and a second set, intended for structure-building, which is executed after a complete first-stage parse has been found. The problem with this parser is that its two-stage design is impractical for large-scale natural language parsing because most actions must be duplicated in the second instruction set.

SUMMARY OF THE INVENTION

A method and apparatus for interactive source language expression recognition and alternative hypothesis presentation and selection are described. In one embodiment, the present invention is a system performing natural spoken language translation. In one embodiment, the present invention receives as input natural spoken language in a source language from a user. Multiple recognition hypotheses in the source language are generated in response to the input. A best hypothesis in the source language is presented to a user as well as alternatives to a portion of the best hypothesis in the source language. The user may choose among the alternatives or correct one of the alternatives. An indication of a choice of one of the alternatives is received from the user, and a revised version of the best hypothesis including the alternative chosen is presented to the user. An output that is representative of the revised version of the best hypothesis in a target language is presented to the user.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 23 is a list of the inflection types handled by an English morphological analyzer of an embodiment of the present invention.

FIG. 24 is a list of top level features to indicate special inflections in an English morphological analyzer of an embodiment of the present invention.

DETAILED DESCRIPTION

A method and an apparatus for a spoken language translation system are provided. In the following description for purposes of explanation, numerous specific details are set forth in order to provide a thorough understanding of the present invention. It will be evident, however, to one skilled in the art that the present invention may be practiced without these specific details. In other instances, well known structures and devices are shown in block diagram form in order to avoid unnecessarily obscuring the present invention. It is noted that experiments with the method and apparatus provided herein show significant speech translation improvements when compared to typical speech translation systems.

Spoken language is typically the most natural, most efficient, and most expressive means of communicating information, intentions, and wishes. At the same time, speakers of different languages face a formidable language barrier. The STS of an embodiment of the present invention provides a system for machine-aided interpersonal communication comprising a number of key features: input by natural, fluent speech (without utterances that are overly long or complicated); no need for the user to possess specialized linguistic or translation knowledge; and, no need for the user to carry out tedious or difficult operations.

Figure 1:
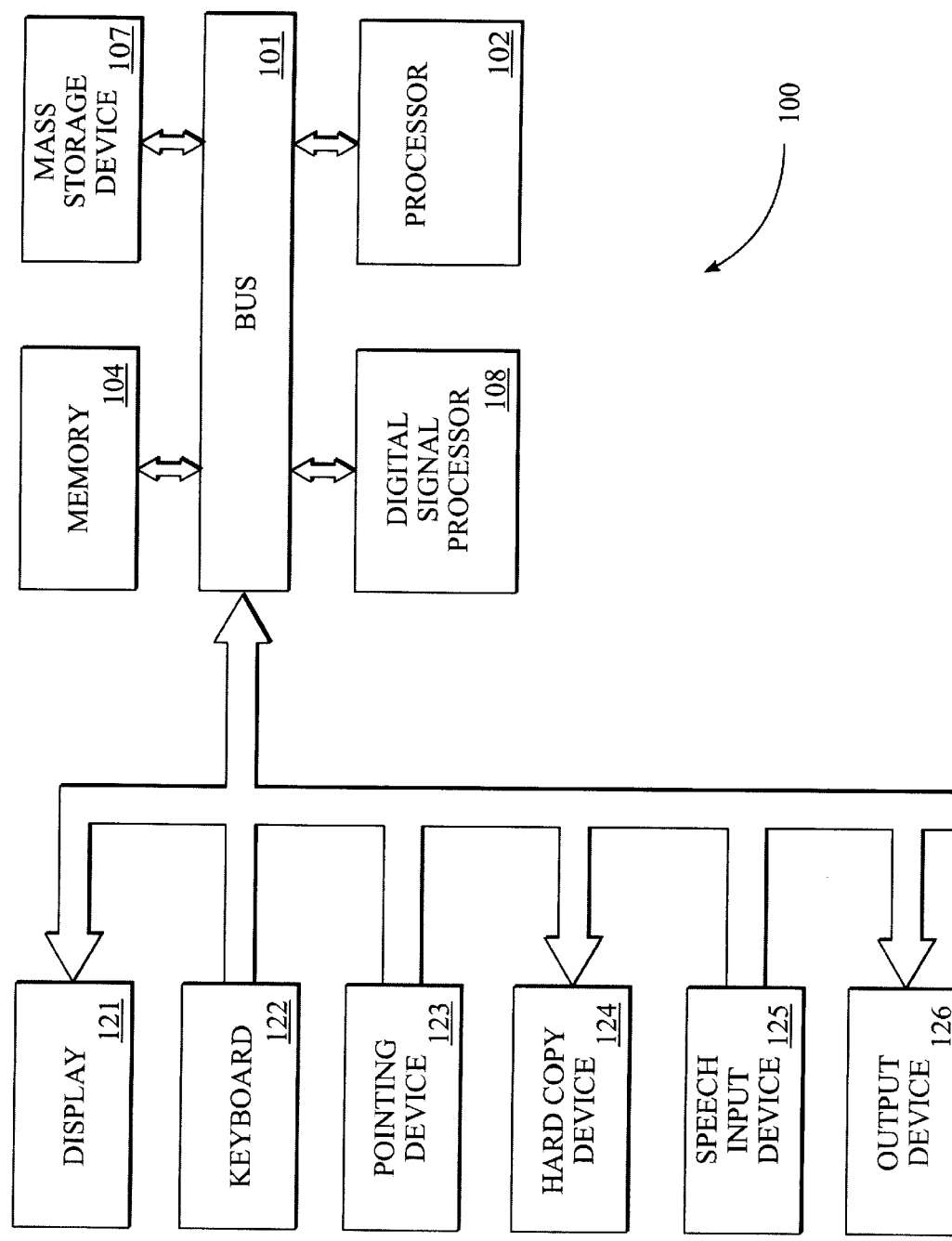
FIG. 1 is a computer system hosting the speech translation system (STS) of an embodiment of the present invention.

FIG. 1 is a computer system 100 hosting the speech translation system (STS) of an embodiment of the present invention. The computer system 100 comprises, but is not limited to, a system bus 101 that allows for communication among at least one processor 102, at least one digital signal processor 108, at least one memory 104, and at least one mass storage device 107. The system bus 101 is also coupled to receive inputs from a keyboard 122, a pointing device 123, and a speech signal input device 125, but is not so limited. The system bus 101 provides outputs to a display device 121, a hard copy device 124, and an output device 126, but is not so limited. The output device 126 may comprise an audio speaker, but is not so limited.

Figure 2:
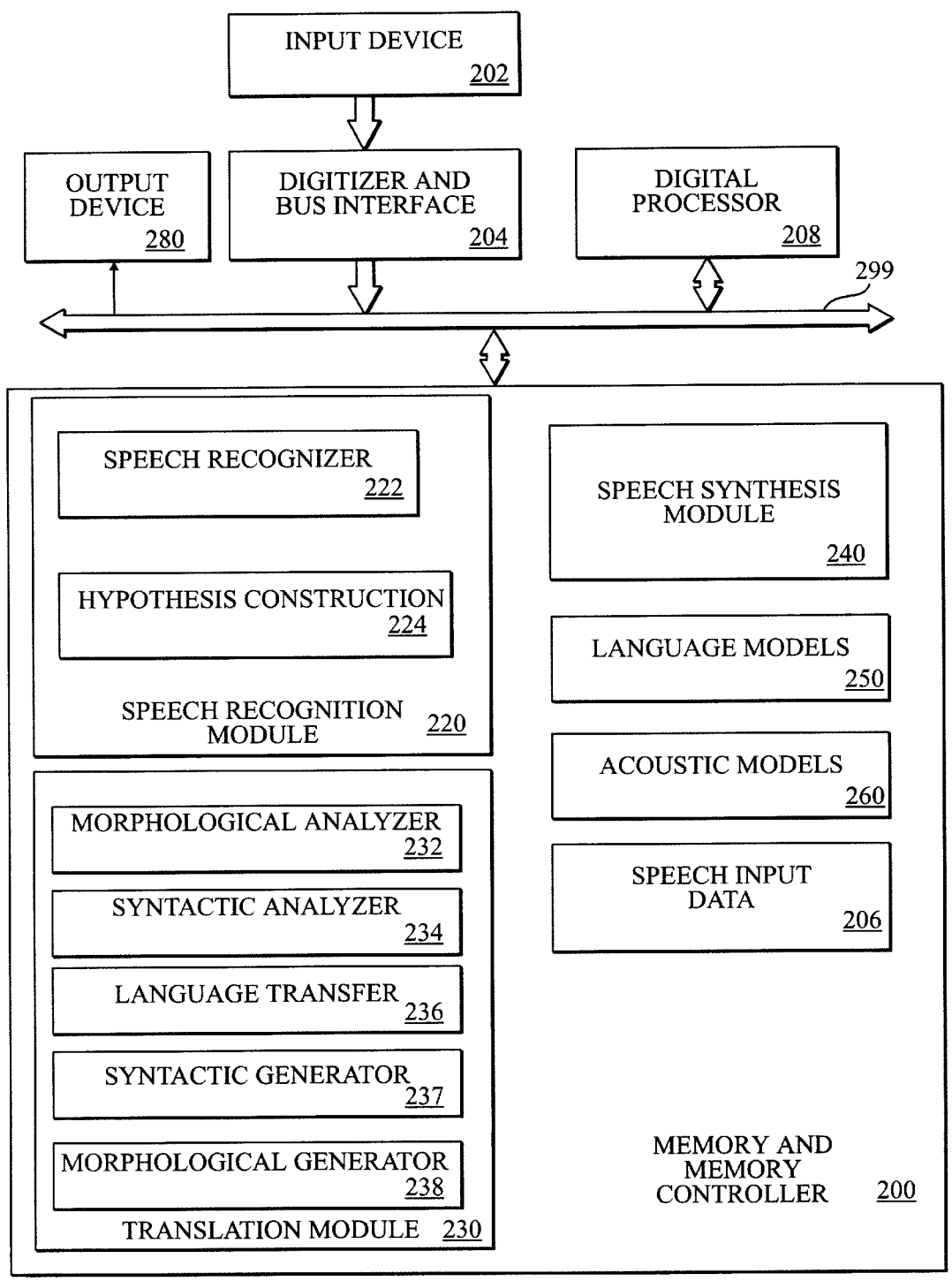
FIG. 2 is a computer system memory hosting the speech translation system of an embodiment of the present invention.

FIG. 2 is a computer system memory 200 hosting the speech translation system of an embodiment of the present invention. An input device 202 provides speech signals to a digitizer and bus interface 204. The digitizer or feature extractor 204 samples and digitizes the speech signals for further processing. The digitizer and bus interface 204 allows for storage of the digitized speech signals in at least one speech input data memory component 206 of memory 200 via the system bus 299, but is not so limited. The digitized speech signals are processed by at least one processor 208 using algorithms and data stored in the components 220–260 of the memory 200. As discussed herein, the algorithms and data that are used in processing the speech signals are stored in components of the memory 220–260 comprising, but not limited to, at least one speech recognition module 220, at least one translation module 230, at least one speech synthesis module 240, at least one language model 250, and at least one acoustic model 260. The speech recognition module 220 of an embodiment of the present invention comprises a speech recognizer 222 and a hypothesis construction module 224, but is not so limited. The translation module 230 of an embodiment of the present invention comprises, but is not limited to, a morphological analyzer 232, a syntactic analyzer 234, a language transfer module 236, a syntactic generator 237, and a morphological generator 238. An output device 280 provides translated output in response to the received speech signals.

The STS of an embodiment may be hosted on a processor, but is not so limited. For an alternate embodiment, the STS may comprise some combination of hardware and software components that are hosted on different processors. For another alternate embodiment, a number of model devices, each comprising a different acoustic model or a language model, may be hosted on a number of different processors. Another alternate embodiment has multiple processors hosting the speech recognition module, the translation module, and the models. For still another embodiment, a number of different model devices may be hosted on a single processor.

The present invention may be embodied in a portable unit that is easily carried by a user. One such embodiment is a laptop computer that includes the elements of FIG. 1 and the elements of FIG. 2. The modules shown in the memory of FIG. 2 may be stored in random access memory (RAM) of the laptop, or may be variously stored in RAM and read only memory (ROM). The ROM may be a removable card. In some laptop embodiments, a conventional processor may be used to perform calculations according to the methods described herein. In other laptop embodiments, a digital signal processor (DSP) may be used to perform some or all of the calculations.

Another portable embodiment is a small unit with specialized functionality, such as a personal data assistant (PDA). For example, one PDA embodiment may perform voice translation functions, voice memo functions, voice e-mail functions, and voice calendar functions, but is not so limited. Another embodiment smaller in size than a laptop computer is a telephone. For example, a cellular telephone may also provide speech translation functions. The size of an embodiment of the present invention is only limited by current hardware size. A pen embodiment and a wristwatch embodiments are envisioned.

For any embodiment, the modules shown in FIG. 2 and any necessary processor may exist on a device such as a laptop computer, or reside elsewhere and be accessed remotely from the unit using known methods and hardware, for example using systems comprising Frequency Modulation (FM) systems, microwave systems, cellular telephone systems, and light modulation systems. For example, elements of the present invention may reside on one or more remote servers that are accessed using a telephone call or a video conference call. In such an embodiment, a user may dial a translation service, which performs translation remotely according to the present invention. Some embodiments, such as cellular telephone and PDA embodiments, allow users to remotely update vocabularies using various communication methods in order to add new words or names or expressions and their translations. In some embodiments, translation may be performed remotely at an internet server and transmitted using internet telephony.

Figure 3:
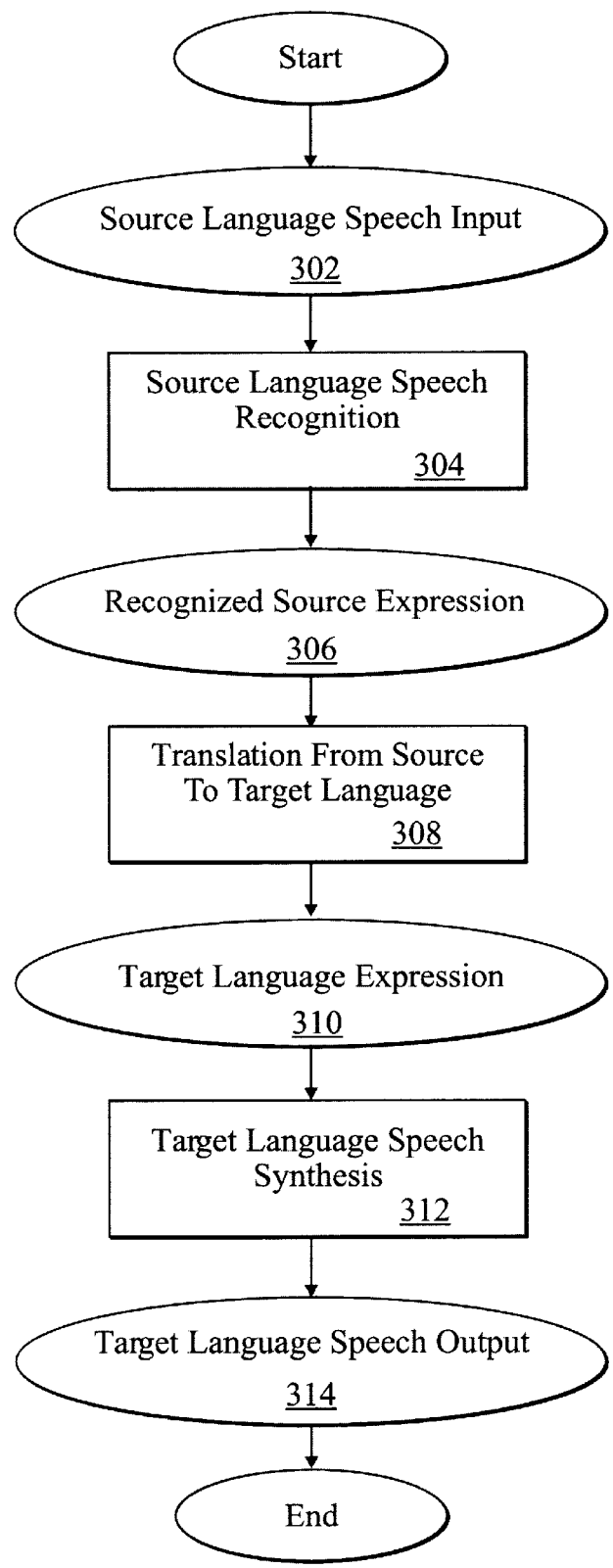
FIG. 3 is a system diagram of the speech translation system of an embodiment of the present invention.

FIG. 3 is a system diagram of the speech translation system of an embodiment of the present invention. The STS of an embodiment is a system that performs speech-to-speech translation for use in facilitating communication between individuals that do not speak the same language, but is not so limited. The STS accepts spoken language in an input or source language. The STS performs speech recognition in the source language while optionally allowing the user to confirm the recognized expression, or allowing the user to choose from a sequence of candidate recognitions. The STS translates the recognized expression from the source language to a target language. In the target language, the STS performs automatic speech synthesis.

In performing spoken language translation, operation begins when a source language speech input 302 is received. Source language speech recognition is performed, at step 304, and a recognized source expression 306 is produced. The recognized source expression 306 is translated from the source language to the target language, at step 308. A target language expression 310 is produced, and the target language expression is used to perform target language speech synthesis, at step 312. The target language speech synthesis produces a target language speech output 314 that represents the source language speech input 302.

Figure 4:
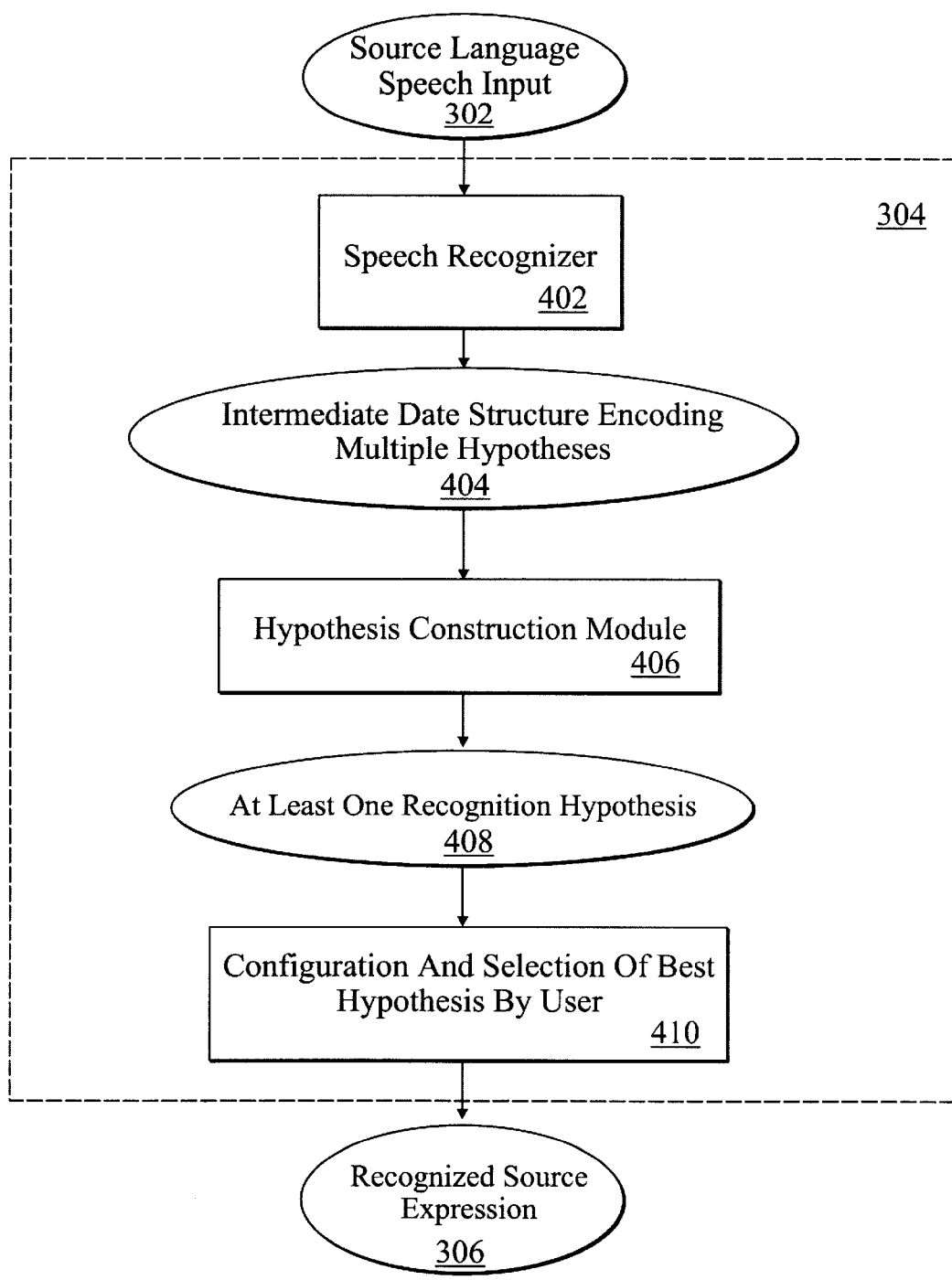
FIG. 4 is a flowchart of source language speech recognition of a speech translation system of an embodiment of the present invention.

FIG. 4 is a system diagram of source language speech recognition 304 of a speech translation system of an embodiment of the present invention. Operation begins when a source language speech input 302 is received. A speech recognizer 402 operates on the source language speech input 302 to produce an intermediate data structure in coding multiple hypotheses 404. A hypothesis construction module 406 produces at least one speech recognition hypothesis 408 from the coded multiple hypotheses 404. Configuration and selection of the best hypothesis is performed, at step 410. An output is provided comprising at least one recognized source expression 306, but the embodiment is not so limited.

Figure 5:
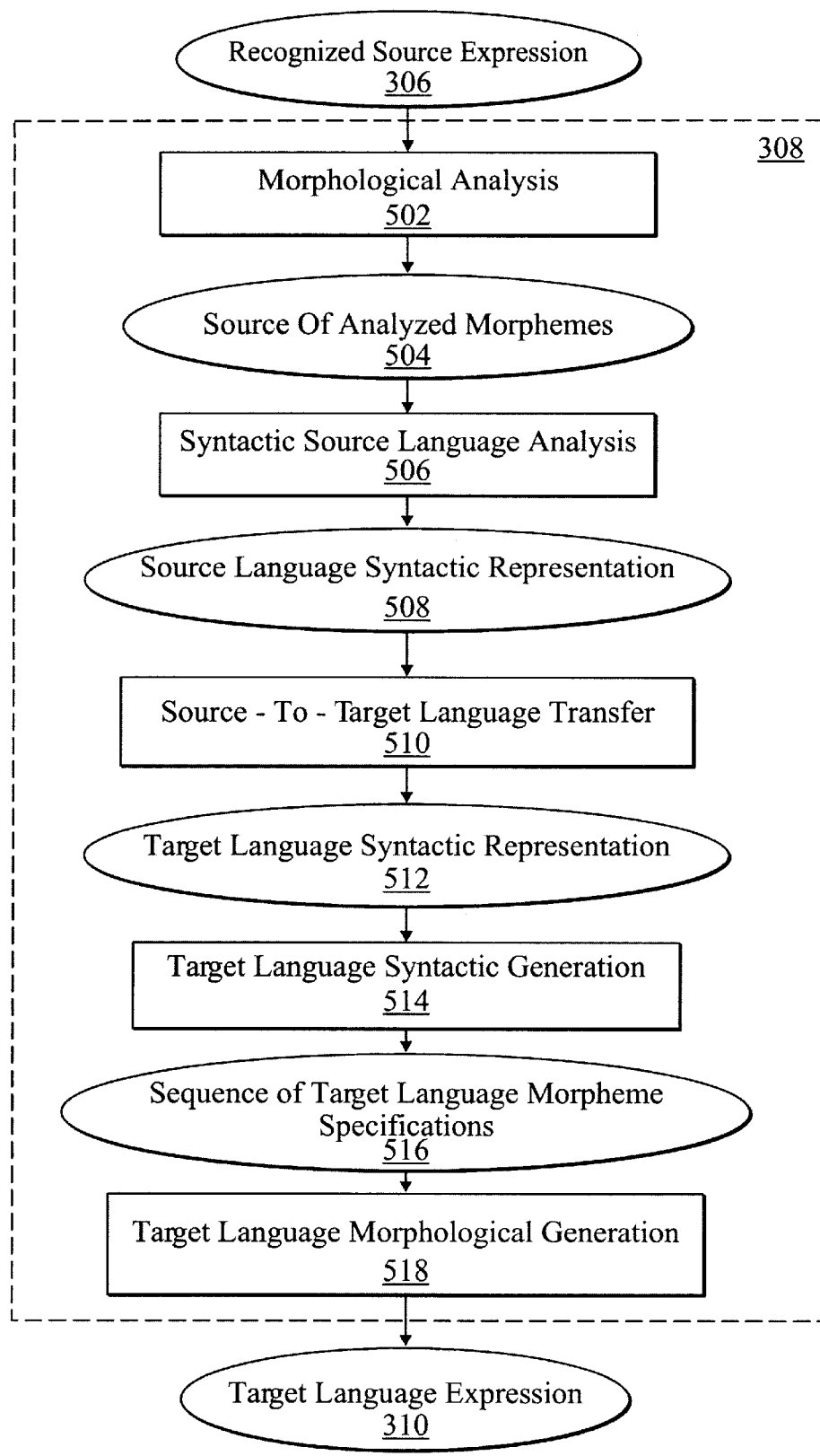
FIG. 5 is a flowchart of translation from a source language to a target language in a speech translation system of an embodiment of the present invention.

FIG. 5 is a system diagram of translation from a source language to a target language 308 in a speech translation system of an embodiment of the present invention. Operation begins upon receipt of a recognized source expression 306. A morphological analysis is performed, at step 502, producing a sequence of analyzed morphemes 504. A syntactic source language analysis is performed, at step 506, on the sequence of analyzed morphemes 504. The syntactic source language analysis produces a source language syntactic representation 508. A source-to-target language transfer is performed, at step 510, resulting in the production of a target language syntactic representation 512. The target language syntactic representation 512 is used to perform target language syntactic generation, at step 514. A sequence of target language morpheme specifications 516 are produced, and are used in target language morphological generation, at step 518. An output is provided comprising at least one target language expression 310, but the embodiment is not so limited.

The STS of an embodiment is able to handle entire sentences in addition to individual words and short phrases. Therefore, each input expression may be quite long resulting in a greater chance of error by a typical speech recognizer. Consequently, unlike the typical speech translator, the STS of an embodiment of the present invention does not translate word-for-word by looking up the input in a dictionary. Instead, the STS of an embodiment analyzes the input, detects or determines the meaning of the input (e.g. question, statement, etc.), and renders that meaning in the appropriate way in a target language.

The STS of an embodiment uses a large vocabulary in order to handle multiple expressions or sentences that can be constructed using the words of the vocabulary. Consequently, unlike a translation system that uses a complete table of input and output words to formulate the translation, the STS of an embodiment of the present invention creates the translation dynamically. Furthermore, the STS processes natural spoken language, meaning that the STS handles ungrammatical speech as often produced by individuals. The STS of an embodiment comprises a user configuration and recognition hypothesis component to aid in handling misrecognitions due to noise and speaker variation. Therefore, the STS of an embodiment has very high translation accuracy, accuracy that greatly improves the usefulness as a communication aid.

The STS of an embodiment of the present invention performs speech translation by integrating two types of processing. The first type, grammar rule based processing, uses rule driven components that perform certain linguistic analysis and generation processes. The second type of processing, analogical processing or example-based processing, does not use a sequence of rules but instead uses a data driven approach. The rule based components perform syntactic and morphological analysis in the source language, and syntactic and morphological generation in the target language. The example-based component performs the transfer from the source language to the target language. The example based component uses an example database comprising a large number of stored pairs of corresponding expressions in the source and target language. As such, morphological analysis comprises the use of a source language dictionary and source language morphological rules. Furthermore, syntactic source language analysis comprises the use of source language computational analysis grammar rules. Moreover, the source to target language transfer comprises the use of at least one example database and a thesaurus describing similarity between words. Target language syntactic generation comprises the use of target language syntactic generation rules. Additionally, target language morphological generation comprises the use of a target language dictionary and target language morphological generation rules.

Spoken language translation requires a flexible and robust mechanism, such as translation by analogy. At the same time, translation becomes more efficient and accurate when structural regularities are exploited. A new method of shallow syntactic analysis used in the present invention is powerful enough to handle a wide variety of grammatical patterns, yet robust enough to process spoken language. The resulting general syntactic analysis module can be combined with an analogical or statistical transfer module to produce high-quality translation in different domains.

Spoken language is characterized by a number of properties that defy analysis by traditional rule-based methods. Although spoken utterances typically consist of shorter, less complex syntactic structures, they often contain fragments and extra items, such as interjections and filled pauses. Ellipses and irregular word order (inversion and left or right dislocation) are also frequently observed. For these reasons, research has turned from the traditional rule-based framework towards more flexible approaches, such as example-based translation. The method and apparatus of an embodiment of the present invention increase the linguistic efficiency and accuracy of example-based translation by exploiting as many linguistic regularities as possible, without attempting analysis that is too deep or too differentiated to be performed efficiently and accurately on spoken language.

A typical translation system requires example data for every possible input in order to achieve high quality translation. In order to achieve good translational coverage with high quality translation without exhaustively listing every possible input in the example database, an embodiment of the present invention captures syntactic regularities. Capturing syntactic regularities supports example-based translation in an embodiment of the present invention in four ways, but the embodiment is not so limited. First, the syntactic regularities generalize the surface variations in the input and in the example data. This reduces the amount of example data required to obtain reasonable coverage, thereby increasing efficiency.

Second, structural analysis enables the STS to correctly combine different parts of examples to cover the input. For high accuracy, the substitution of parts of the input must operate on syntactic constituents rather than on, for example, substrings of the input.

Third, syntax helps generate grammatical output in the target language. The target language generation component needs a certain amount of syntactic knowledge and syntactic operations to produce grammatically correct output. A tag question in English is one example of such a purely syntax-driven operation.

Finally, syntax is required to model spoken language phenomena. Even seemingly arbitrary speech properties, such as interjections and irregular word order, represent operations on syntactic constituents rather than on substrings.

The method for providing syntactic analysis and data structure for translation knowledge in an embodiment of the present invention comprises performing syntactic analysis on the input using at least one parse tree comprising a number of nodes. Each node comprises at least one production rule. Furthermore, at least one node comprises at least one level of nested production rules. Syntactic analysis is performed on at least one entry from the example database using the parse tree. At least one linguistic constituent of the input is determined, and a pragmatic type and a syntactic type of the linguistic constituent are determined. Outputs are provided comprising an identification of the input.

Conceptually, the structural analysis component of an embodiment comprises two steps, but is not so limited. The first step comprises parsing with a context-free grammar, while the second step comprises producing feature structures for the input sentence. This is accomplished with the aid of annotations to the context-free grammar rules.

Figure 6:
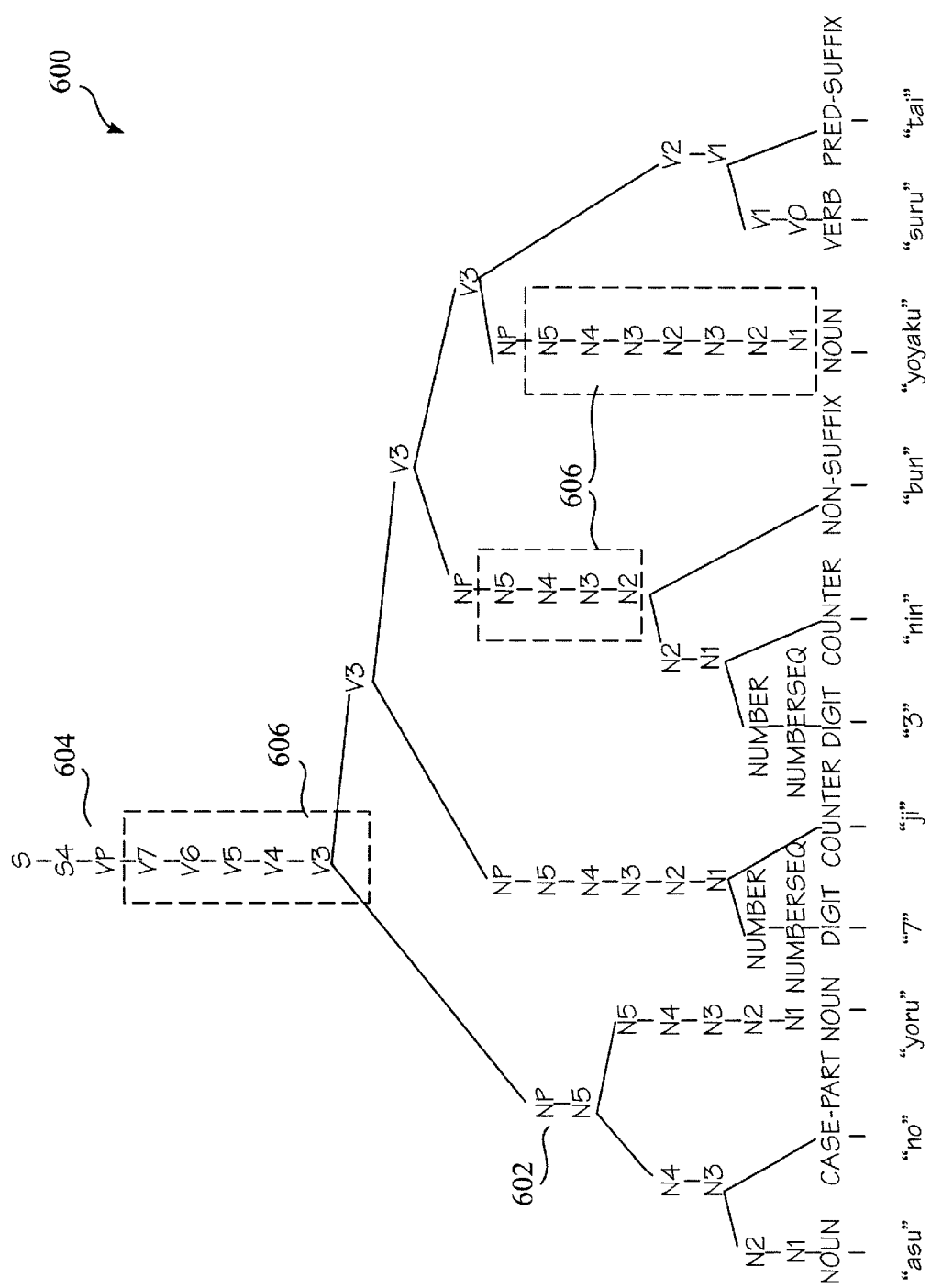
FIG. 6 is a context-free phrase structure tree of an embodiment of the present invention obtained by parsing the input "I want to make a reservation for three people for tomorrow evening."

FIG. 6 is a context-free phrase structure tree 600 of an embodiment of the present invention obtained by parsing the input "I want to make a reservation for three people for tomorrow evening at seven o'clock." The context-free grammar of an embodiment identifies syntactic constituents comprising noun phrases 602, verb phrases 604, adjective phrases (not shown), adverb phrases (not shown), and postpositional phrases (not shown), but the embodiment is not so limited. The grammar of an embodiment comprises 272 grammar rules, and uses 38 terminal and 78 non-terminal symbols, but is not so limited. This large number of non-terminals and the resulting deeply nested structure 606 of the context-free parse tree 600 are used to parse the wide variety of possible input expressions as efficiently as possible, with a minimal amount of local ambiguity (multiple parsing paths) and global ambiguity (multiple overall analyses). This is achieved by performing as much computation as possible with a Generalized Left-Right (GLR) parser, and by keeping the feature structure manipulations to a minimum, but the embodiment is not so limited. The nested structure comprises nested production rules within the nodes of the of the parse trees. Each level of the nested production rules comprises a production rule for a different combination of linguistic constituents of the input, but is not so limited.

Figure 7:
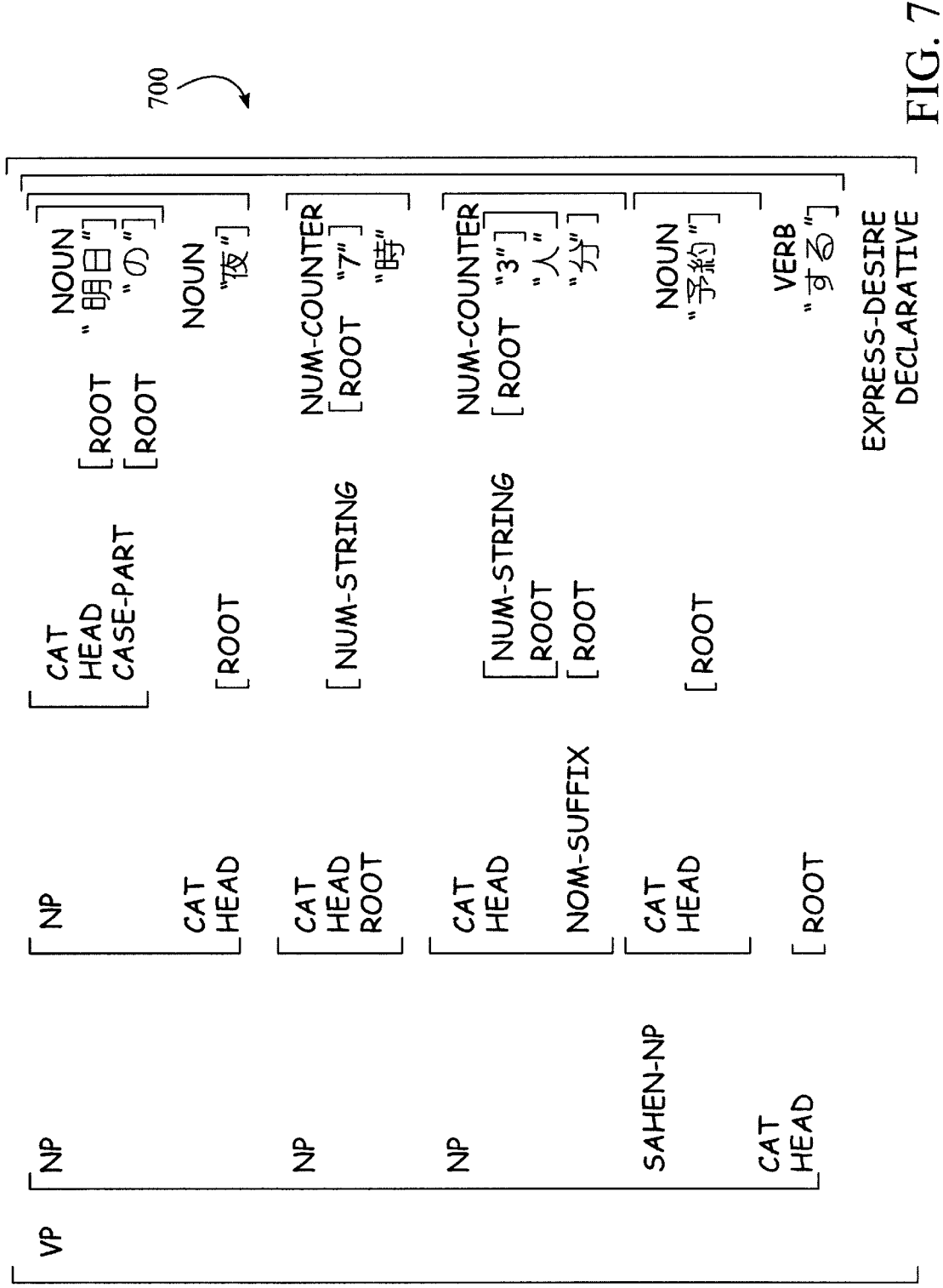
FIG. 7 is a final feature structure of an embodiment of the present invention representing a shallow syntactic analysis of the input "I want to make a reservation for three people for tomorrow evening."

The information in the feature structures of an embodiment of the present invention originates at the lexical level in the morphological analysis component. The feature structure manipulation annotations on the context-free grammar rules pass this information on to higher-level constituents, apply tests to it, and re-arrange it depending on the syntactic structure of the expression. During this process, structural aspects of the context-free parse tree relating to information comprising sentence types, pragmatic function, honorifics, and modals are reduced to simple feature-value pairs. FIG. 7 is a final feature structure 700 of an embodiment of the present invention representing a shallow syntactic analysis of the input "I want to make a reservation for three people for tomorrow evening."

The syntactic analysis of an embodiment of the present invention is based on lexical-functional grammar, with five important differences, but is not so limited: grammatical functions of constituents are not recovered; feature structures are not re-entrant; arc names need not be unique; arc order is significant; and feature structures are manipulated using more efficient graph matching and copying operations instead of graph unification.

The shallow syntactic analysis described herein may be applied to the example pairs as well as to the input, and it is general enough to be used across different domains. This separates the domain-dependent translation examples and thesaurus from domain-independent syntactic knowledge. The resulting general syntactic analyzer can be used to quickly construct a new example database for a different domain.

Typical rule-based syntactic analysis is known to have flaws that include brittleness, ambiguities, and difficult maintenance. Brittleness is a condition wherein, if the rule fails, there will be no output. Ambiguity is a condition wherein purely rule-based systems lack flexibility and effective ways to deal with multiple analyses. Difficult maintenance results when the rules become more interdependent as the coverage expands and it becomes difficult to improve the performance. An embodiment of the present invention addresses the problem of how much syntactic analysis should be performed and how the syntactic analysis should be integrated with example-based machine translation so that the advantages of syntactic analysis and example-based processing are maximized without suffering from the flaws of rule-based systems.

Figure 8:
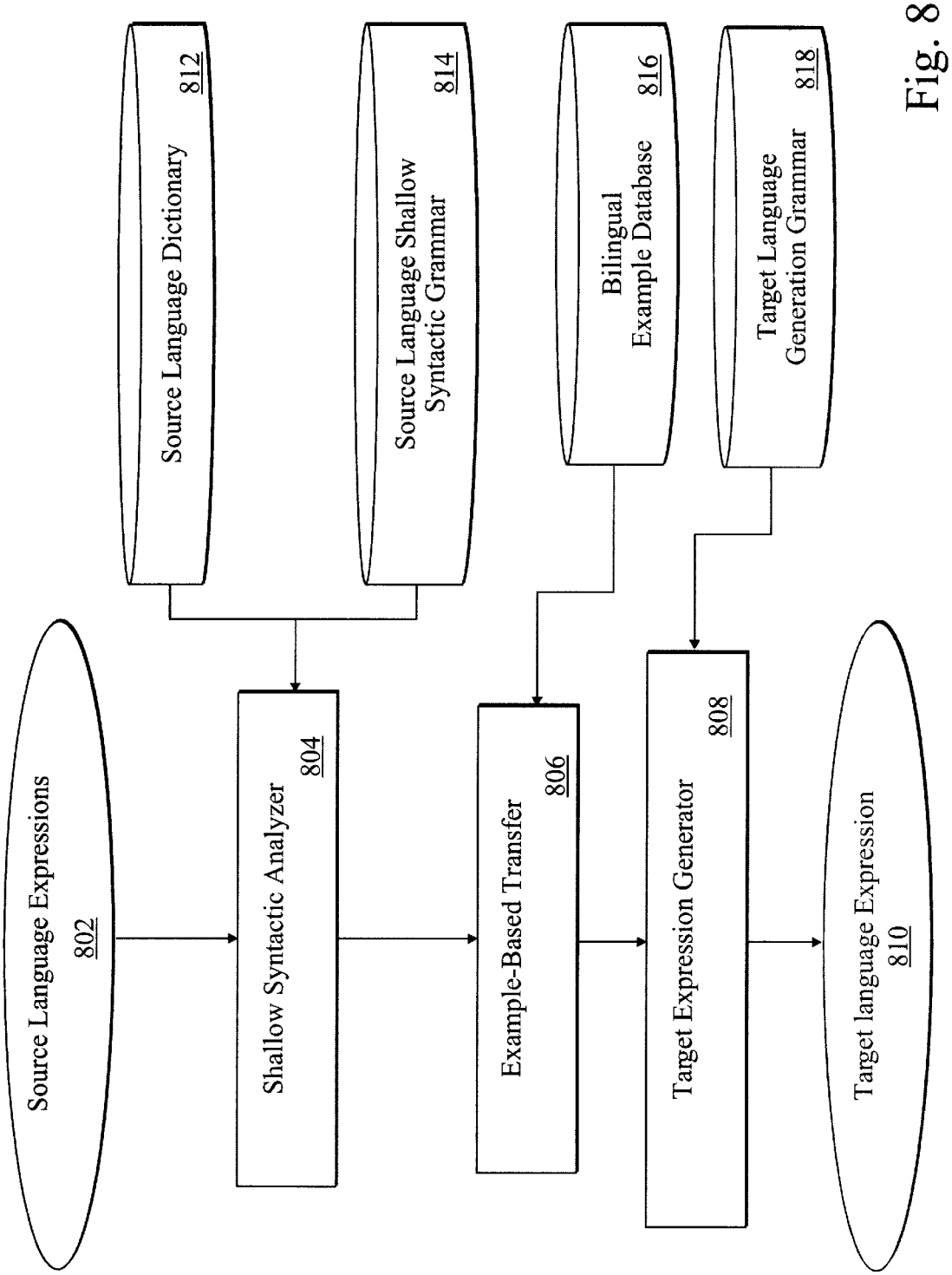
FIG. 8 shows an example-based translation system architecture using syntactic analysis of an embodiment of the present invention.

FIG. 8 shows an example-based translation system architecture using syntactic analysis of an embodiment of the present invention. The translation system architecture of an embodiment comprises a shallow syntactic analyzer 804, an example based transfer 806, and a target expression generator 808, but is not so limited. The shallow syntactic analyzer 804 accesses and uses at least one source language dictionary 812 and at least one source language shallow syntactic grammar 814, but is not so limited. The example based transfer 806 accesses and uses at least one bilingual example database 816, but is not so limited. The target expression generator 808 accesses and uses target language generation grammar 818, but is not so limited. The shallow syntactic analyzer 804 receives a source language expression 802 and the target expression generator 808 outputs a target language expression 810, but is not so limited.

Figure 9:
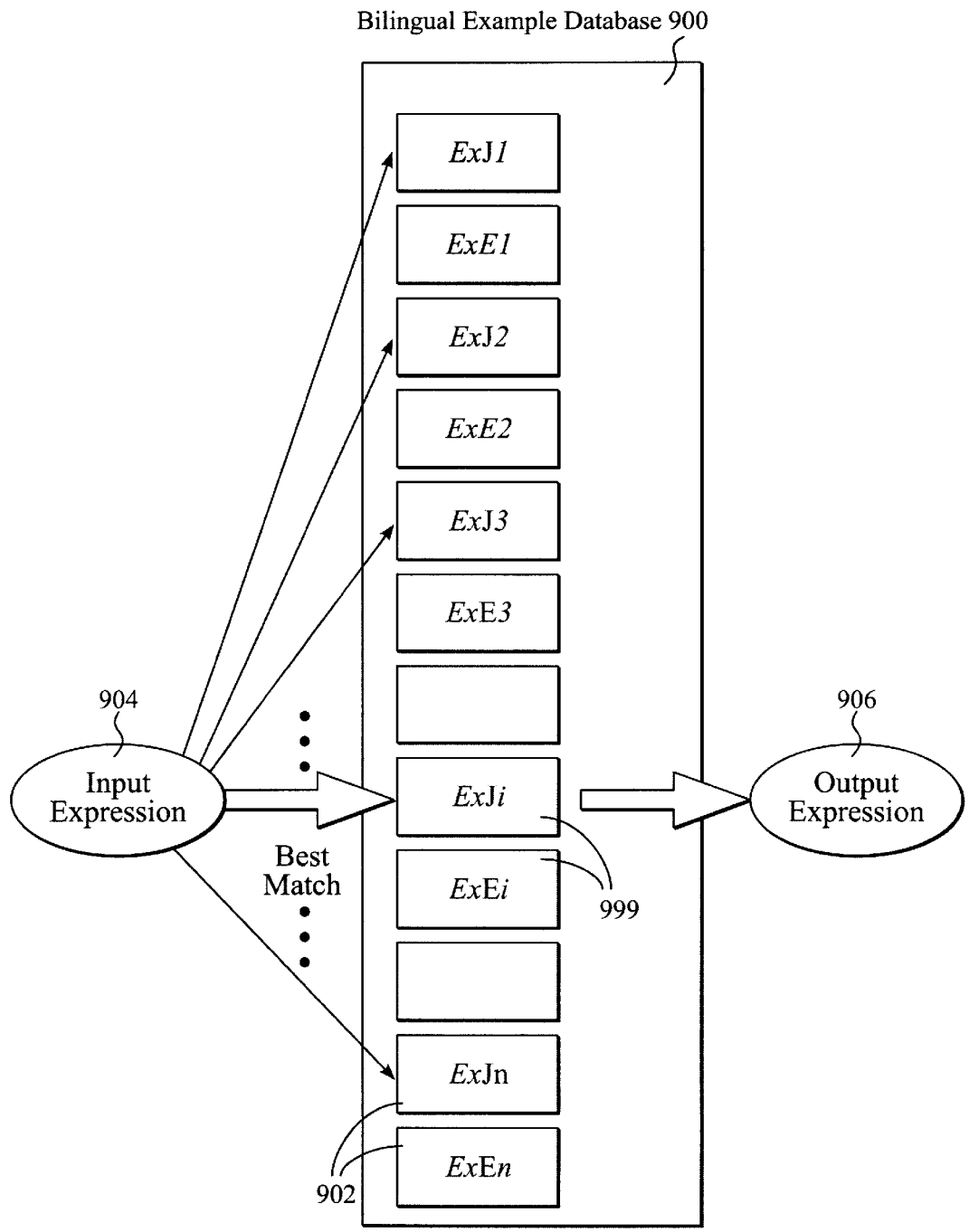
FIG. 9 shows a bilingual example database of an embodiment of the present invention.
Figure 11:
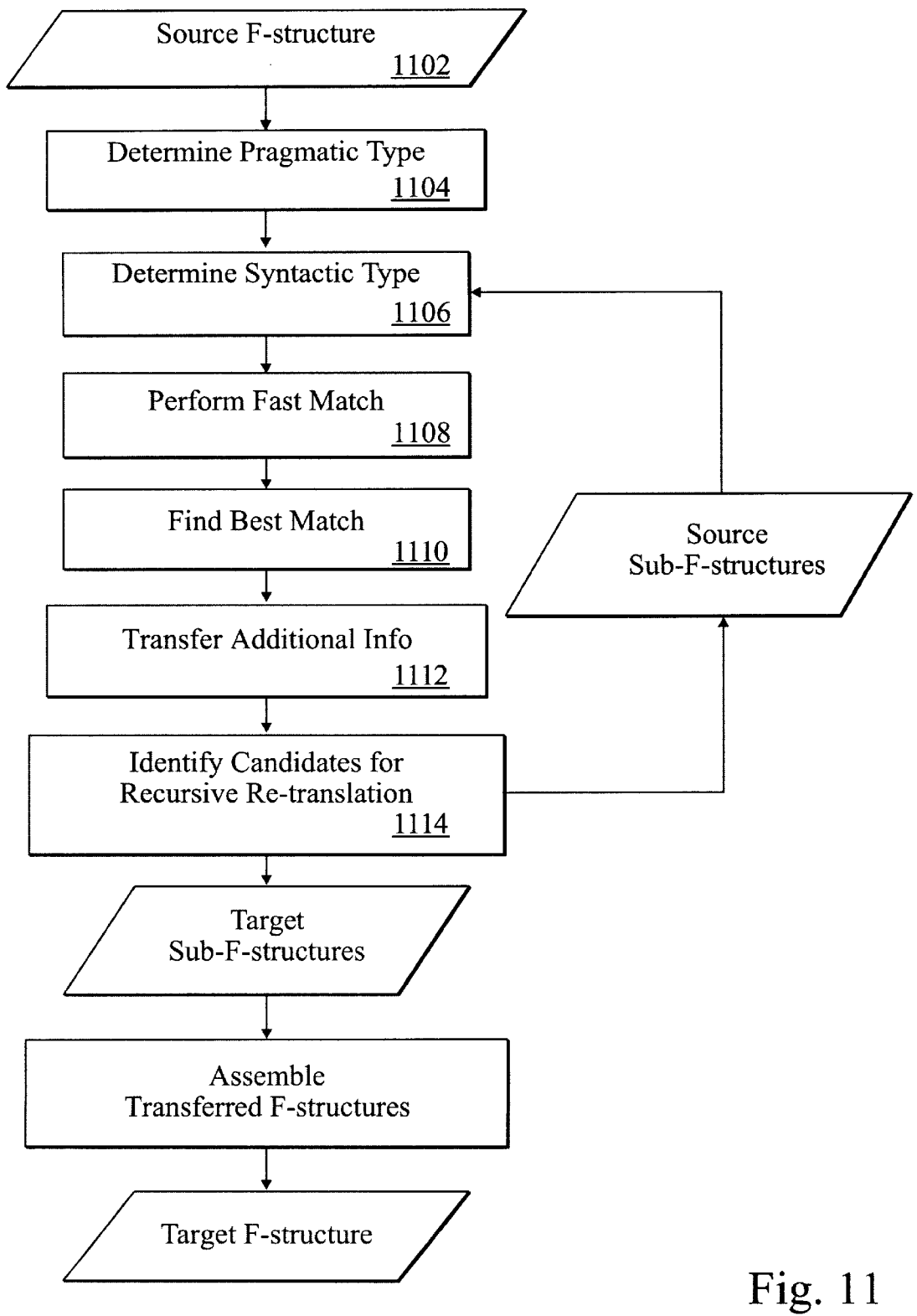
FIG. 11 is a matching and transfer algorithm of a translation component of an embodiment of the present invention.

FIG. 9 shows a bilingual example database 900 of an embodiment of the present invention. The bilingual example database 900 comprises a large database of pre-translated bilingual expression pairs 902, but is not so limited. When an input expression 904 is received into the bilingual example database 900, the STS of an embodiment consults the bilingual example database 900 to find the expression pair 999 whose source language portion ExJi is most similar to the input 904. The system then returns the target language portion ExJi of the expression pair 902 as its output 906. This is performed one or more times recursively, as shown in FIG. 11 herein.

The syntactic analysis of an embodiment of the present invention comprises a shallow analysis to recognize linguistic constituents such as noun phrases, verb phrases and prepositional phrases. In performing the shallow analysis, the information regarding the order of the constituents is retained as the constituents appear in the input. Furthermore, surface variations are reduced into features. For example, "I eat an apple" and "I ate an apple" will have the same analysis except that the second one has the feature indicating that the tense is past. Furthermore, the syntactic analysis of an embodiment of the present invention does not try to resolve syntactic ambiguities such as prepositional phrase attachment. Moreover, the syntactic analysis does not try to identify grammatical functions (direct object, indirect object) or thematic roles (agent, experiencer) of each constituents.

In an embodiment of the present invention, the format of the analysis representation is that of an adapted feature structure representation. The order of the constituents is represented by the order of the arcs that appear in the feature structure.

The level of shallow syntactic analysis performed by an embodiment of the present invention is very robust and general as it does not depend on particular domains or situations. The shallow syntactic analysis performed in an embodiment of the present invention is performed both on the example data and on the input string. In this way, a clear separation between domain independent general linguistic knowledge and domain dependent knowledge can be achieved. Consequently, a change of domain only affects the lexicon and example database, but the embodiment is not so limited.

Figure 10:
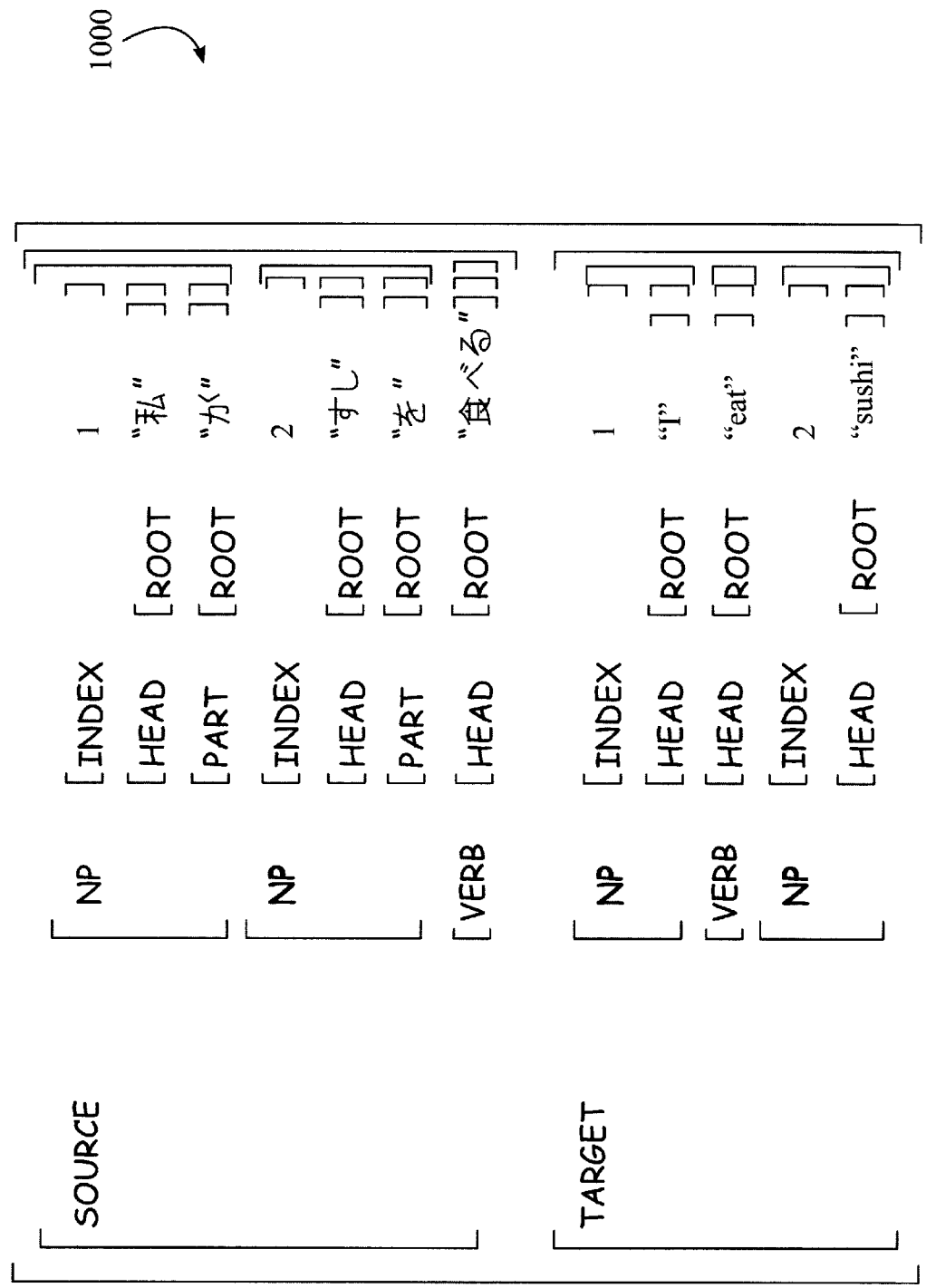
FIG. 10 shows an example of a bilingual example data representation of an embodiment of the present invention.

FIG. 10 shows an example of a bilingual example data representation 1000 of an embodiment of the present invention. In an embodiment, the format of the bilingual example database is that of an adapted feature structure representation, but is not so limited. The adapted feature structure representation contains two sub-feature structures for corresponding source language expression and target language expressions. Any correspondence between constituents and the source language expression and the target language expression is indicated by indices.

The syntactic analyzer of an embodiment of the present invention is implemented in a parser having a mechanism to manipulate feature structure representations. For efficient implementation, as described herein, an embodiment of the present invention uses a GLR parser with feature structure operators. Furthermore, the shallow syntactic analyzer can also be integrated with a statistical processing component which may help resolve lexical ambiguities and other local ambiguities to reduce the burden of the example-data processing, but the embodiment is not so limited.

Natural human speech is not perfectly complete and grammatical as it often includes repeated words, omissions, and incomplete sentences. For these reasons, the translation method of an accurate spoken language translation system needs to be more flexible and robust, wherein the translation component is able to handle input that has incorrectly added or deleted or substituted words. To provide flexibility and robustness, a typical speech translation system uses many different types of translation knowledge, thereby resulting in an example specificity problem of how an example-based system can use examples with different grades of linguistic specificity. An embodiment of the present invention uses a hybrid rule-based/analogical approach to speech translation that provides a solution to this problem.

The hybrid rule-based/analogical approach of the present invention comprises methods for example combination, fast match, and best match. FIG. 11 is a matching and transfer algorithm of a translation component of an embodiment of the present invention. The translation component receives a source feature structure 1102 and performs a detailed syntactic analysis on an example database and on the input string. This creates shallow syntactic representations, which comprise, among other linguistic information, the pragmatic type 1104 and the sentence type 1106 of the expression or sentence.

A matching and transfer is then performed, wherein an initial fast match 1108 is performed that quickly checks compatibility of the input and the example database. This initial fast match 1108 eliminates the necessity of carrying out a time and space consuming detailed match for every example in the example database. A detailed or best match 1110 is performed as an optimization procedure over operations to insert, delete or join (match up) 1112 parts of the syntactic representation. This provides a flexible way to match that does not require all parts of the structure to be accounted for since insertions and deletions are possible. Using this approach, multiple examples may be identified and combined 1114 to match an input because the matching and transfer procedure works recursively over parts of the shallow syntactic input structure. The method described herein for matching and transfer is general in the sense that it does not depend on examples of any particular degree of linguistic specificity; it works with very general examples as well as with very specific examples that include a great deal of context on which the translation depends.

Automatic translation by analogy of an embodiment of the present invention comprises the use of bilingual pairs of examples to represent what has been described as translation knowledge, the information about how equivalent meanings are expressed in the source and target languages. This approach is inherently robust, making it well-suited to spoken language, which often exhibits extra-grammatical phenomena. In addition, translation accuracy is improved in the present invention by adding examples with more specific context, provided that the example specificity problem can be solved. The most challenging problem in example-based translation, however, relates to the need to combine examples of different grades of linguistic specificity. In applying example pairs of increasing linguistic specificity, an embodiment of the present invention uses example pairs comprising co-indexed, shallow syntactic representations that are able to capture information at any level of linguistic specificity. Consequently, the present invention solves the example specificity problem by dividing it into three sub-problems: best match; fast match; and, example combination.

The best match sub-problem involves finding the best match from the example database given an input. An embodiment of the present invention uses a matching procedure based on operators for inserting, deleting, or matching parts of the shallow syntactic representation of the input comprising a tree with nodes and arcs. This matching procedure is implemented using a dynamic programming algorithm that minimizes the overall match cost, which is defined in a recursive manner over arcs in the trees.

The three possible actions (insert, delete, join) incur costs that depend on the labels of the arcs, the costs for the node values of the arcs, and costs based on feature-values and thesaurus-based semantic similarity for words. For an input node I with arcs $<i_1, i_2, \ldots, i_m>$ and an example node E with arcs $<e_1, e_2, \ldots, e_n>$, the match Cost C(I,E) is defined by the following recurrence:

$$C(<i_1, i_2, \ldots, i_m>; <e_1, e_2, \ldots, e_n>) = \min \begin{cases} C(i_2, \ldots, i_m; e_1, e_2, \ldots, e_n) + \text{add} + \text{cost}(i_1) \\ C(i_1, i_2, \ldots; i_m, e_2, \ldots, e_n) + \text{delete} - \text{cost}(e_1) \\ C(i_2, \ldots, i_m; e_2, \ldots, e_n) + \text{join} - \text{cost}(i_1, e_1) \end{cases}$$

In a typical domain, the required example database grows to a considerable size. For example, in an embodiment of the present invention, the database comprises approximately 10,000 example pairs. Thus, it is not possible to carry out detailed matching of the input to every example, and the search space for the best match problem must be constrained in some way.

The search space is constrained in an embodiment of the present invention by performing an initial fast match that rules out unlikely examples, but the embodiment is not so limited. The shallow syntactic analysis module identifies the syntactic type and the pragmatic type of the input, and matching is constrained according to these types. In addition, a fast match is performed based on the syntactic head of the constituents to be matched; this can be constrained to equality, or to a thesaurus-based measure of close semantic similarity.

In order to translate a wide variety of inputs, an embodiment of the present invention combines a number of examples (or parts of examples) in the transfer process, by performing matching and transfer recursively on parts of the shallow syntactic representation of the input. At each recursive step, after detailed matching has been performed, additional information in the input that is not covered by the example is handled, as well as redundant information from the example, but the embodiment is not so limited.

The present invention comprises a method for constructing one or more hypotheses for speech recognition in a speech translation system, presenting the hypothesis or hypotheses to the user along with optional translations, having the user select the best hypothesis, and then using the selection from the user to perform adaptation of the hypothesis construction component. Using this method, the system learns the types of things that the user says and improves system performance of the hypothesis construction component. The effect is that the correct hypothesis will be presented to the user as the most likely hypothesis more and more often as the user uses the device.

Figure 12:
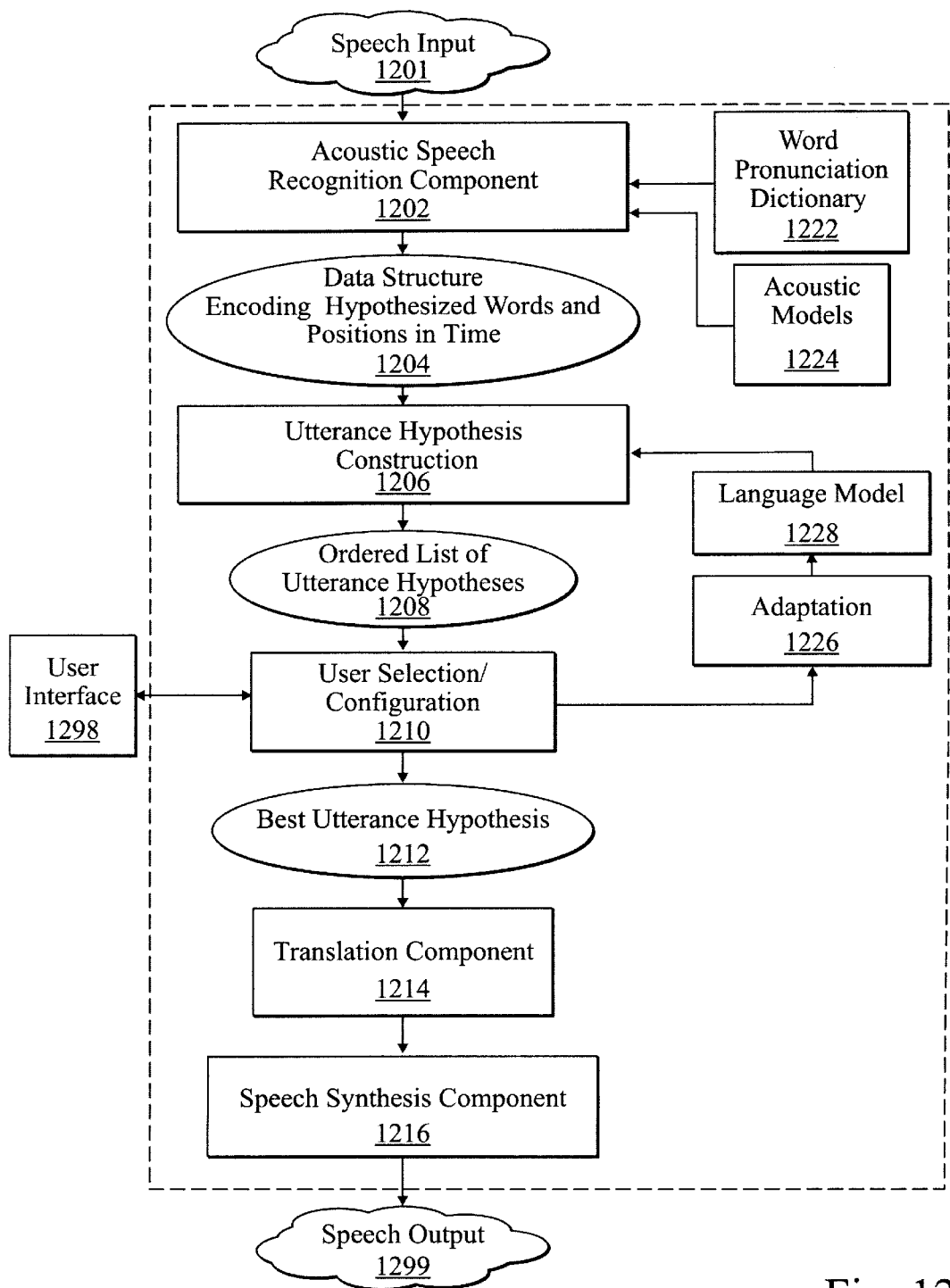
FIG. 12 shows the hypothesis selection components of a speech translation system of an embodiment of the present invention.

FIG. 12 shows the hypothesis selection components of a speech translation system of an embodiment of the present invention. Operation begins with the receipt of a speech input 1201 at the acoustic speech recognition component 1202. The acoustic speech recognition component 1202 accesses and uses at least one word pronunciation dictionary 1222 and at least one acoustic model 1224 to generate at least one data structure 1204 encoding hypothesized words and their corresponding positions and time. The data structure information 1204 is used for utterance hypothesis construction 1206, wherein an ordered list of utterance hypotheses 1208 are produced. User selection-configuration 1210 then takes place, wherein a user selects the best utterance hypothesis 1210. User selection-configuration is accomplished through a user interface 1298. The user selection is used as an adaptation input 1226 to the speech translation system language models 1228. The best utterance hypothesis 1212 is used as an input to the translation component 1214 and the speech synthesis component 1216 of the speech translation system, which produce a translated speech output 1299.

A problem faced by a speech translator is that the speech input has many degrees of variability as a result of user accents, different user pronunciations, input speech at different volumes, different positions of the microphone during speech, and different types and levels of background noise. For these reasons, the speech recognition component does not attempt to identify only the exact utterance made by the user. When the speech input is garbled or ungrammatical, identification of the exact utterance may not be possible. Prior systems that operate by attempting to identify exact utterances may produce no output or an incorrect output when it is not possible to perform an identification. In this case, the user may be unsure why the input was not operated on by the system. The present invention overcomes these problems. The speech recognition component of an embodiment identifies a number of possibilities, and the user may choose from these possibilities, or speech recognition hypotheses, the correct or best hypothesis.

Figure 13:
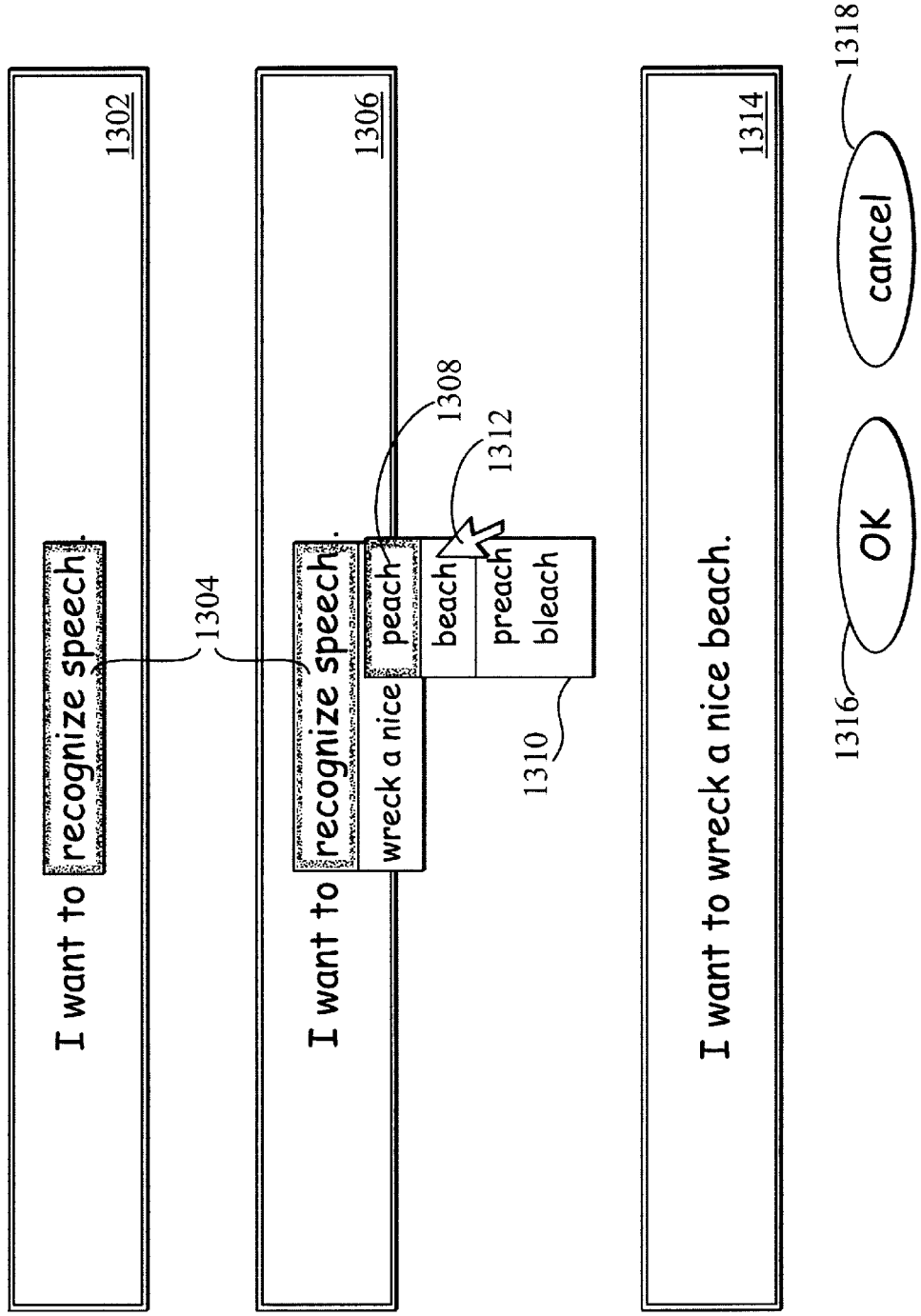
FIG. 13 is a diagram of a one embodiment of a display with alternative utterance hypotheses.

An embodiment of the user interface 1298 of FIG. 12 comprises a display screen on which utterance hypotheses are displayed for the user. FIG. 13 is an illustration of one embodiment of a display screen. The best utterance hypothesis 1302 is displayed. In this case, the best utterance hypothesis is the sentence "I want to recognize speech." In addition to forming alternative utterance hypotheses and displaying the best utterance hypothesis, the present invention recognizes segments of the best utterance hypothesis that may have alternative hypotheses. These segments are highlighted, in this embodiment, to indicate to the user that the segment 1304 is one of a group of hypotheses. In one embodiment, if there are multiple segments that have alternative hypotheses, the largest segment is chosen as the highlighted segment.

The user may activate the highlighted segment 1304 by, for example, moving a cursor to the highlighted segment 1304 and clicking a mouse button. When the highlighted segment 1304 is activated, alternative hypotheses for the segment are displayed. Display 1306 includes the best utterance hypothesis and several alternative hypotheses for segment 1304. The alternative hypotheses vary in one segment. In this case, the segment is the highlighted word 1308, "peach". When the highlighted segment 1308 is activated by the user, the alternatives 1310 to "peach" appear. The alternatives to "peach" are "beach, "preach", and "bleach". Cursor 1312 is shown activating the alternative "beach". If the correct alternative to segment 1308 is not among the alternatives 1310, the user may correct the highlighted segment, in various embodiments, by pronouncing the correct alternative, by spelling the correct alternative, or by entering the correct alternative by typing it on a keyboard of a host system.

In one embodiment, the user corrections to alternatives are stored with an indication of a slightly greater likelihood of being correct. Over time, if the particular correction is made repeatedly, it accrues more likelihood of being a correct alternative each time it is chosen. In this way, the user's preferences or habits are learned by the present invention and translation becomes faster and more accurate.

The sentence 1314 is the translated input as modified by the user. If the sentence 1314 is acceptable to the user it may be selected for translation by activating the "OK" 1316. If the sentence 1314 is not acceptable, it may be rejected by activating the "cancel" 1318. If the "cancel" 1318 is activated, the user may reenter the input.

Figure 14:
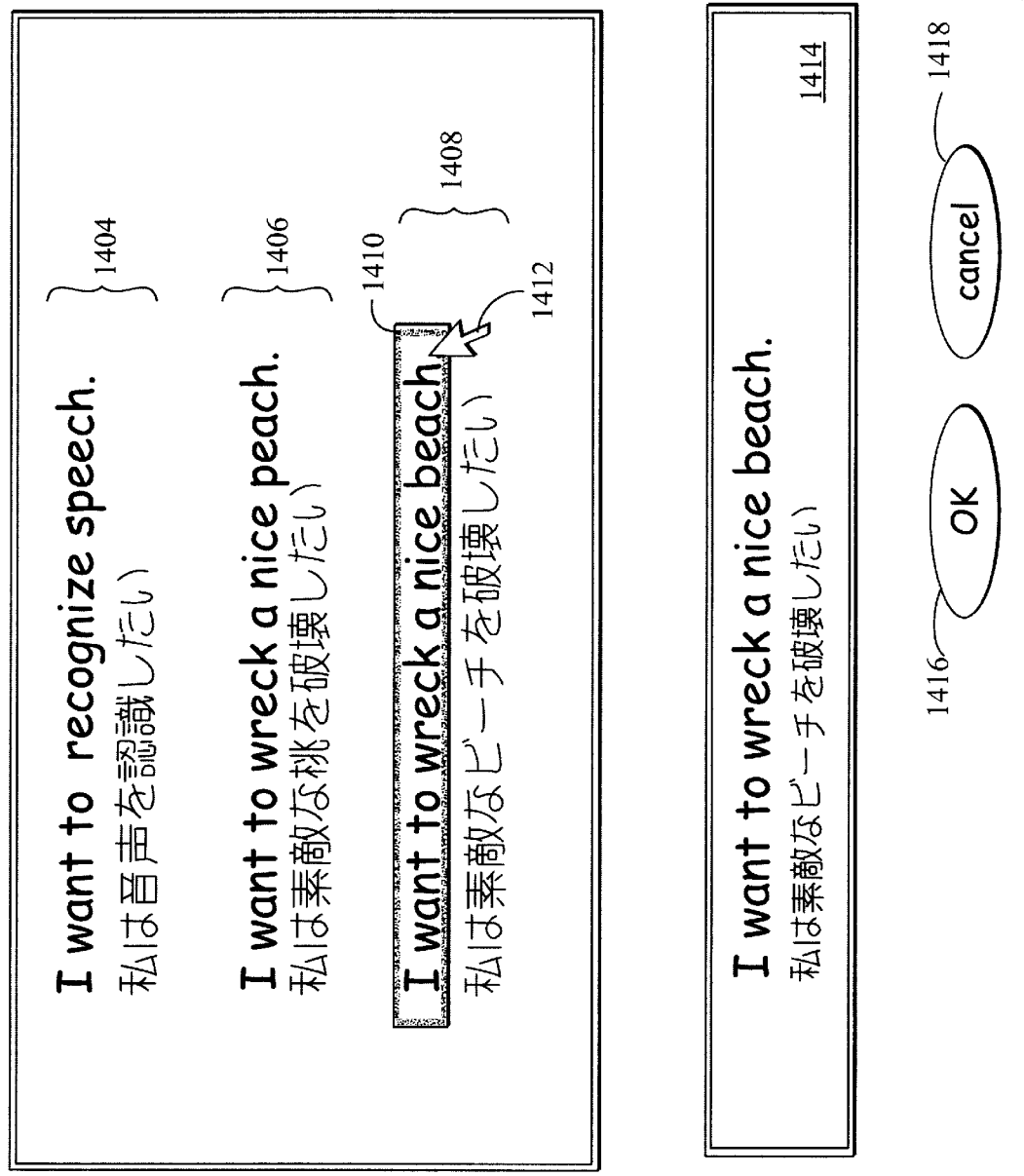
FIG. 14 is a diagram of a one embodiment of a display with alternative utterance hypotheses.

FIG. 14 is an illustration of a display of another embodiment which may be particularly useful to a user who has some knowledge of the target language. The alternate hypotheses of an input in the source language are translated. The hypotheses alternatives are displayed as source language-target language pairs 1404, 1406 and 1408. In this case the source language is English and the target language is Japanese. In one embodiment, the source language-target language pairs are displayed as an ordered list with the most likely hypothesis listed first and the least likely hypothesis listed last. The user selects the preferred source language-target language pair by activating source language expression 1410 with cursor 1412. The selected source language-target language pair 1414 is displayed with "OK" 1416 and "cancel" 1418 so that the user may select or reject source language-target language pair 1414.

Figure 15:
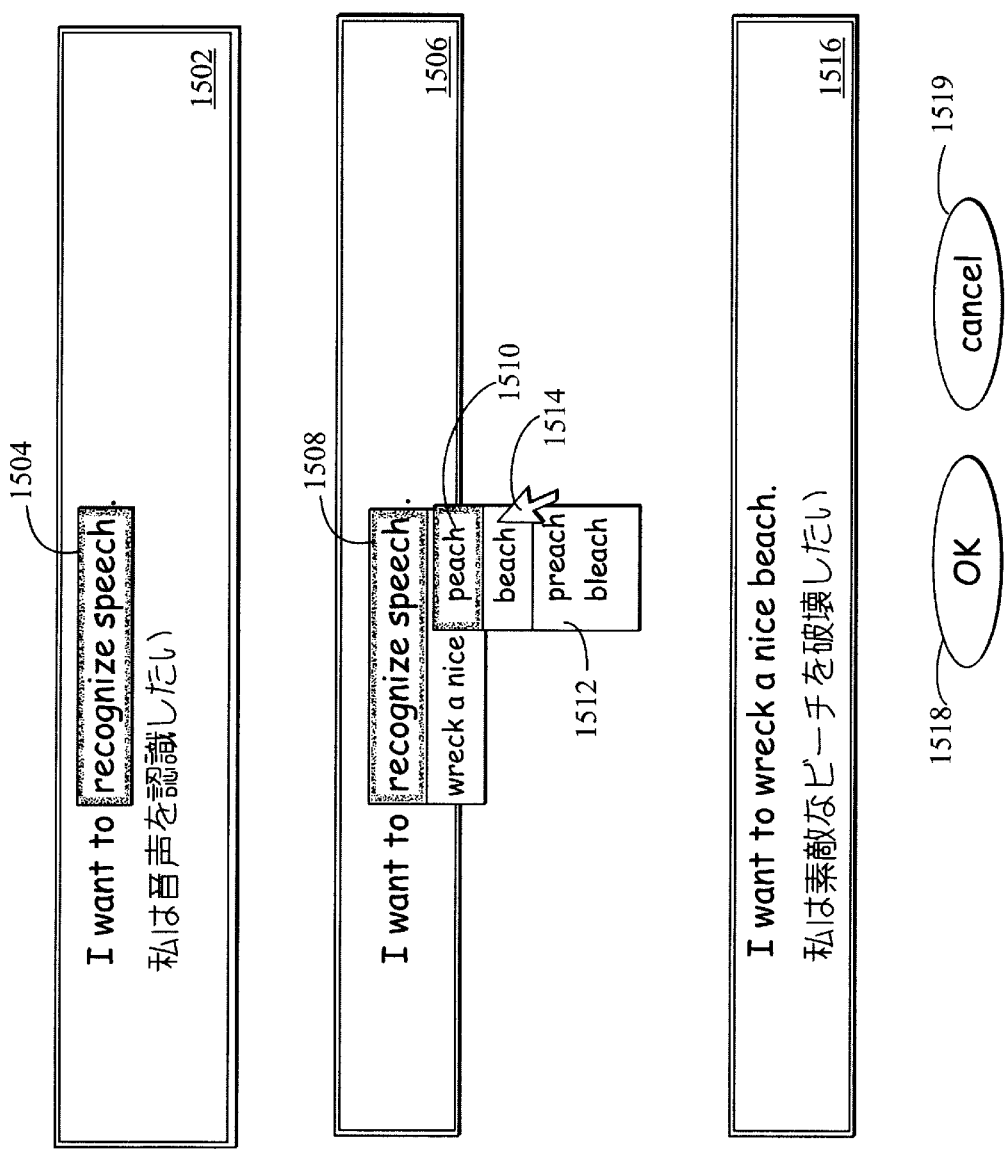
FIG. 15 is a diagram of a one embodiment of a display with alternative utterance hypotheses.

FIG. 15 is another embodiment of the present invention which is especially useful for users with some knowledge of the target language. Hypothesis pair 1502 is the best hypothesis in the source language with its target language representation. Highlighted segment 1508 has alternative hypotheses. The alternative hypotheses to highlighted segment 1508 differ in a segment that, in this case, is one word indicated by highlighted word 1510. The alternatives 1512 are displayed for the user. When cursor 1514 activates the alternative "beach", the selected hypothesis pair 1516 is displayed. The user may choose or reject the selected hypothesis pair 1516 by activating "OK" 1518 or "cancel" 1519. If the user has an adequate understanding of the target language, the embodiment of FIG. 15 allows the user to confirm both the speech recognition result and the translation result.

Figure 16:
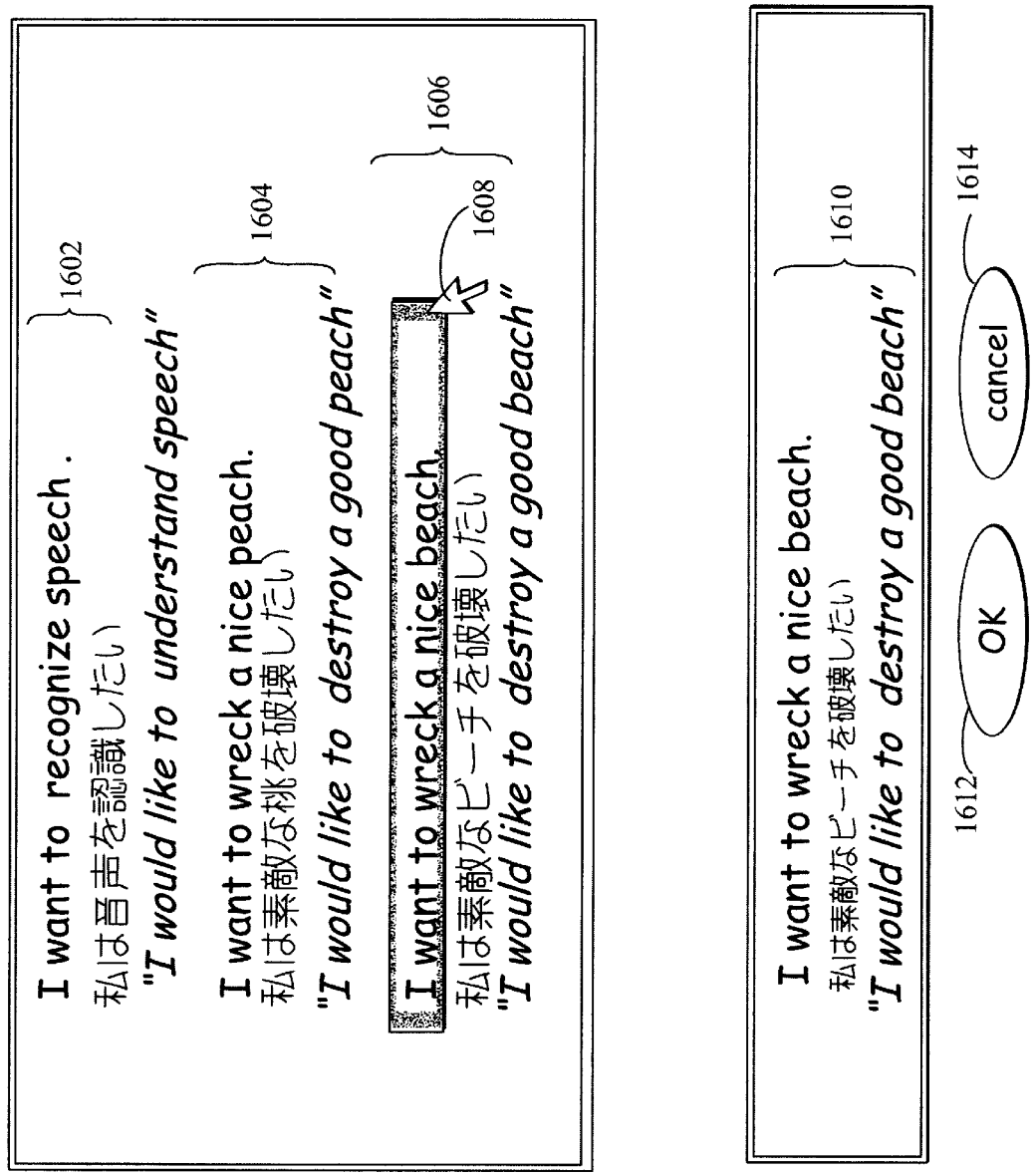
FIG. 16 is a diagram of a one embodiment of a display with alternative utterance hypotheses.

FIG. 16 shows a display of another embodiment for systems with bi-directional translation capability. The speech recognition hypotheses are displayed as hypothesis sets 1602, 1604 and 1606. Each of hypothesis sets 1602, 1604 and 1606 include a source language hypothesis, a target language translation of the source language hypothesis, and a source language back-translation of the target language translation. The user may therefore determine if the target language hypothesis conveys the intended meaning. Cursor 1608 is shown activating the target language hypothesis of hypothesis set 1606, which causes hypothesis set 1606 to be displayed as selected hypothesis set 1610. The user may accept or reject selected hypothesis set 1610 by activating "OK" 1612 or "cancel "1614".

Figure 17:
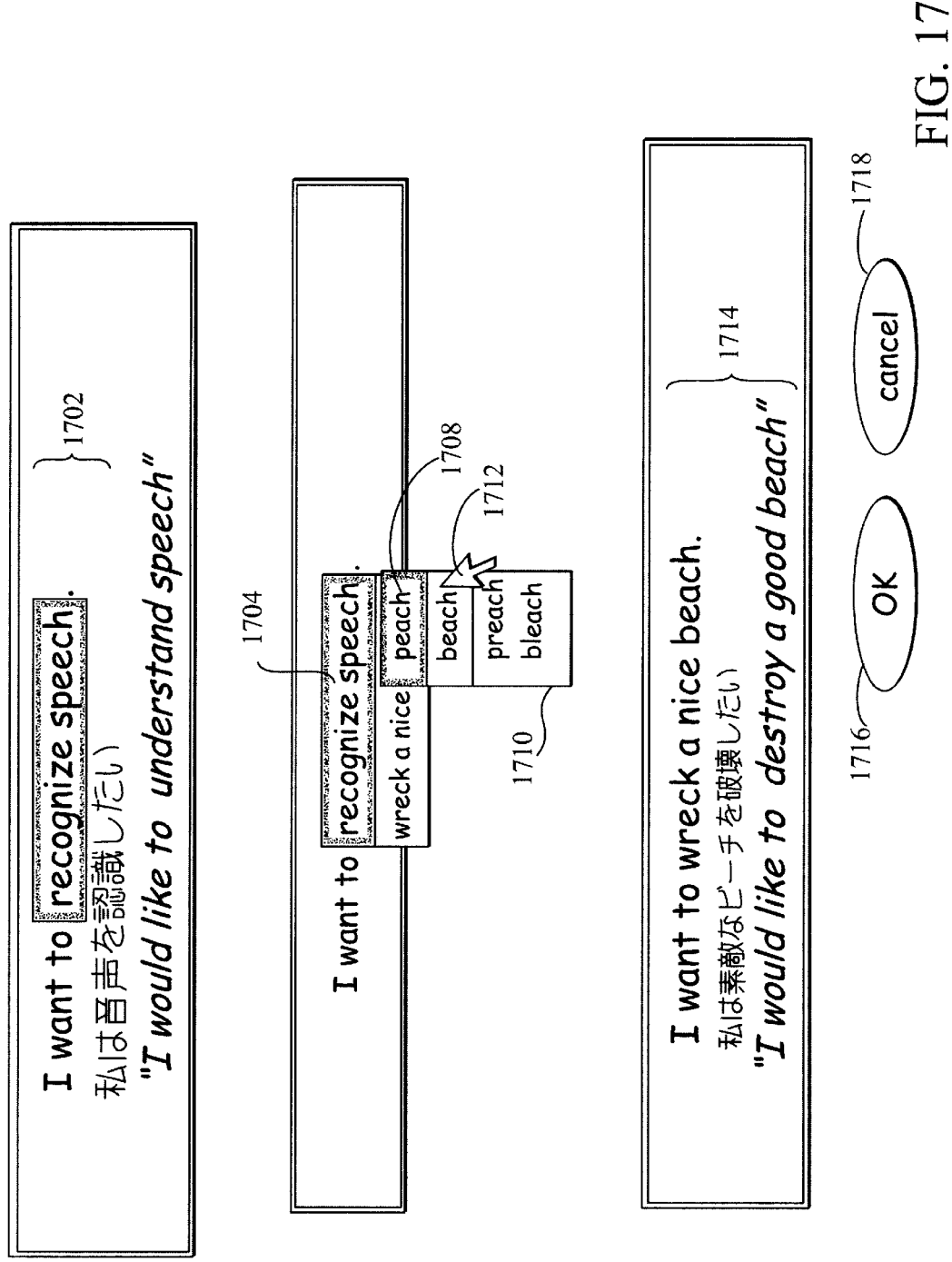
FIG. 17 is a diagram of a one embodiment of a display with alternative utterance hypotheses.

FIG. 17 shows yet another embodiment of a display. Hypothesis set 1702 is displayed in response to a source language input. Hypothesis set 1702 includes the best hypothesis source language recognition "I want to recognize speech.", along with the target language translation of the best hypothesis source language recognition and the back-translation "I would like to understand speech." The best hypothesis source language recognition includes a highlighted segment 1704 that has alternative hypotheses. The alternative hypotheses differ in one segment. The segment is the single final word indicated by the alternative 1708, which is "peach". Cursor 1712 is shown selecting the alternative "beach" from among alternatives 1710. In response to the choice of alternative 1712, hypothesis set 1714 is displayed. Hypothesis set 1714 includes the selected source language hypothesis "I want to wreck a nice beach" along with the target language translation of the selected source language hypothesis and the back-translation "I would like to destroy a good beach."

Other embodiments not specifically described may include different combinations of the features described with reference to FIGS. 13–17.

In other embodiments, the alternative hypotheses are displayed with numbers and the user may choose among them by speaking or entering a number corresponding to the choice.

In various embodiments, recognition hypotheses may be the result of a speech recognition process, a handwriting recognition process, an optical character recognition process, or user entry on a keyboard device.

In one embodiment, the displays of FIGS. 13–17 are all present in a single system as different modes of operation, and a user may choose between the different modes of operation.

The speech recognition and hypothesis/hypotheses construction steps are carried out separately, but the embodiment is not so limited. In the first stage, the speech recognizes user acoustic information to propose hypotheses for words in the speech signal. In the second step, the hypothesis construction component takes this information, and constructs an ordered list of entire utterances that are recognition hypotheses for the entire speech input. As an intermediate step, the STS of an embodiment may also construct a word graph, but is not so limited.

The utterance hypothesis construction component of an embodiment uses information about language to construct utterance hypotheses. This information is called a language model because it is a mathematical model that is used to assign probabilities to utterances. These utterance probabilities are derived from probabilities of parts of the utterance, of certain segments, or of other derived features or characteristics. For example, a standard language model used in speech recognition uses so-called n-gram probabilities, such as unigram probabilities of words occurring P(Word), bigram probabilities of a word occurring given that the previous word has occurred $P(word_i/word_{i-1})$, and trigram probabilities of a word occurring given that the previous two words have occurred $P(word_i/word_{i-2}, word_{i-1})$. The overall probability of an utterance is then calculated from these basic probabilities.

Another approach to creating a language model is to use other types of basic probabilities. For example, syntactic analysis may be performed, and the basic probabilities may make reference to the probabilities of certain grammar rules used in the analysis. Or, the basic probabilities could make reference to grammatical functions such as "subject", "verb""object", so that a basic probability is formulated of the form P(verb=word$_i$/subject=word$_j$, object=word$_k$. The confirmation/selection action performed by the user to carry out adaptation of the language model may be used regardless of the type of basic probability used. The effect of this will be that the hypothesis construction component adapts to the utterances that the user makes, and learns to favor utterances that the user is more likely to make. Then, these utterances will appear higher and higher on the ordered list of utterance hypotheses, and the speech translator becomes relatively easier to use.

Figure 18:
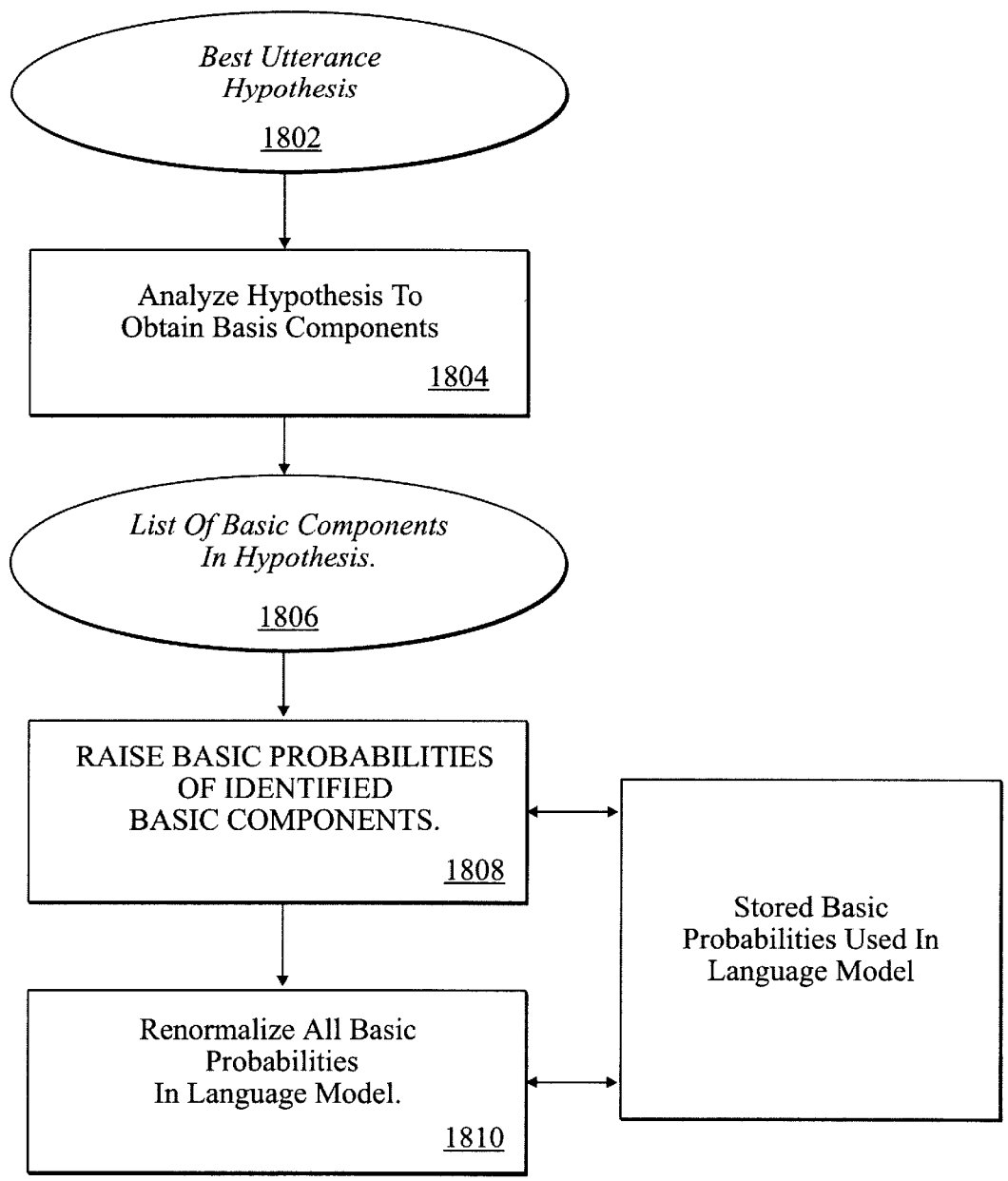
FIG. 18 is a flowchart for language model adaptation of a speech translation system of an embodiment of the present invention.

FIG. 18 is a flowchart for language model adaptation of a speech translation system of an embodiment of the present invention. The fundamental idea for carrying out the adaptation is to take the correct or best utterance hypothesis 1802 that was selected by the user, and to analyze 1804 it according to the language model. For example, if it is an n-gram language model, then the analysis would consist of identifying the individual words and word bigrams and trigrams in the hypothesis. A list of basic components in the hypotheses is generated 1806, and credit is assigned to these basic units by raising the probabilities for the basic units 1808. Then, all the basic probabilities in the language model are re-normalized 1810 which has the effect of slightly lowering all other basic probabilities.

Although English morphology is a relatively well-understood phenomenon, the computational treatment of morphological problems and the integration of a morphological analyzer with other components of a speech translation system should take into account the intended application and overall efficiency. Morphological analysis is the process of analyzing words into morphemes, identifying root forms and grammatical categories, and detecting lexical ambiguity and out-of-vocabulary words. The output of the analysis can be used as input to a parser and other natural language processing modules. The STS of an embodiment of the present invention comprises an Analyzer for Inflectional Morphology (AIM). The AIM of an embodiment of the present invention provides computational efficiency, ease of maintenance of dictionaries, accurate performance for the intended application, and ease of integration with other tools and components.

The AIM of an embodiment identifies the word root and reduces the remaining morphemes of the input word to features. There are two types of morphology: inflectional and derivational. Inflectional morphology deals with morphemes that function as grammatical markers, such as the plural marker -s-, or the past-tense marker -ed in English. Derivational morphology deals with prefixes or suffixes that alter the stem's syntactic category or semantic content, such as un- and -ment in the word unemployment. As the AIM of an embodiment handles inflectional morphology, the number of entries in the computational dictionary of the STS as well as the number of entries in the translation knowledge base of the STS are reduced because different inflections do not typically influence the translational context.

While typical two-level morphological analyzers apply an array of morphological rules in parallel, the AIM of an embodiment uses a sequential approach that overcomes the disadvantages of two-level morphology, notably slow processing speed, notational complexity, and the problem that correct analysis is possible only if all finite-state transducers make their way to the end. The AIM receives a string of words as an input and returns the analysis of each word in the form of a lexical feature structure, a linguistic data structure that contains feature-value pairs for strings, symbols, and numbers. As it analyzes each word, the AIM consults the dictionary, whose entries also resemble lexical feature structures, but is not so limited. Once the morphological analyzer identifies the root and the inflection of the input word, it takes the formation from the dictionary, and inserts appropriate feature-value pairs for inflection into the output feature structure. This output format allows the AIM of an embodiment to be integrated with a syntactic parser that operates on feature structures, while also providing other STS components quick access to relevant features (e.g. the ROOT of each word).

Figure 19:
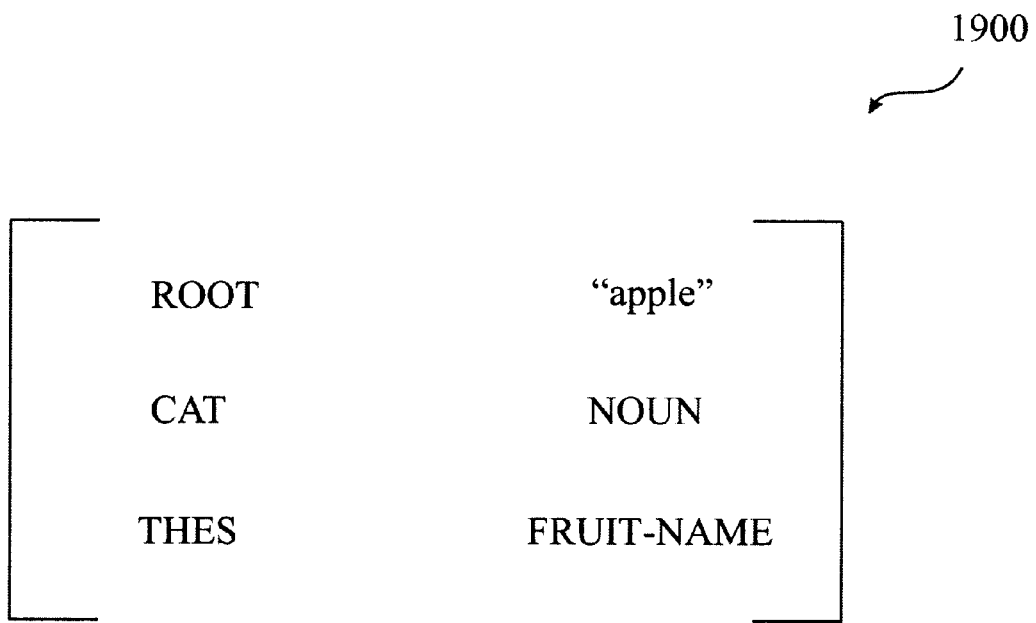
FIG. 19 shows an entry to which default inflectional rules apply in an embodiment of the present invention.

Each lexical entry contains information about the base form (ROOT), the grammatical category (CAT), and optional information about semantic contents (THES), person, number, case, gender, category preferences, and lexical type. In terms of inflectional information encoding, three types of lexical entries are discerned by the AIM of an embodiment:

(1) Entries to which default inflectional rules apply: these entries do not have to contain any inflectional information. FIG. 19 shows an entry 1900 to which default inflectional rules apply in an embodiment of the present invention.

(2) Entries to which special inflectional rules apply: these entries comprise one or more features that indicate special morphographic changes or the (in)ability to undergo certain inflections that are normally possible within a grammatical category. Examples of these features include (Y-TO-I+) for candy, and (ZERO-PLURAL+) for ice. Since these labels are very straightforward and few in number for each grammatical category, this scheme does not impose too much of a burden on the process of adding new entries to the dictionary.

Figure 20:
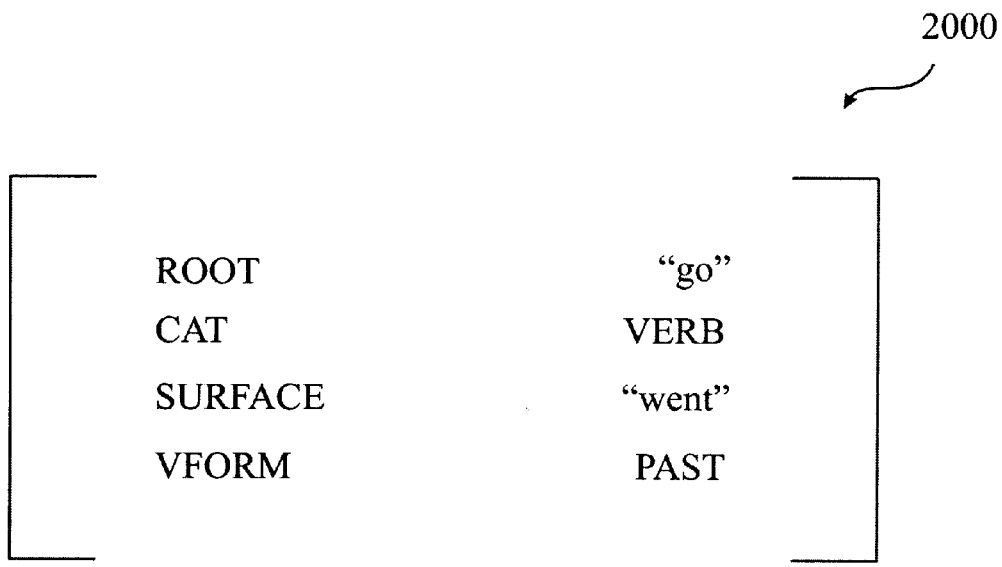
FIG. 20 shows an entry that has an irregular inflection in an embodiment of the present invention.

(3) Entries that have irregular inflections: irregular inflections are represented as separate entries with an additional string-feature slot (SURFACE) that contains the surface form. These irregular form entries can also contain any other kind of relevant information for that particular inflected form. FIG. 20 shows an entry 2000 that has an irregular inflection in an embodiment of the present invention.

Having separate entries for each irregular form does add some complexity to dictionary maintenance, but the irregularly inflected forms are limited in number. By sorting all dictionary entries by the ROOT feature, the dictionary entries are organized in a way that maximizes usability for the STS of an embodiment of the present invention.

Figure 21:
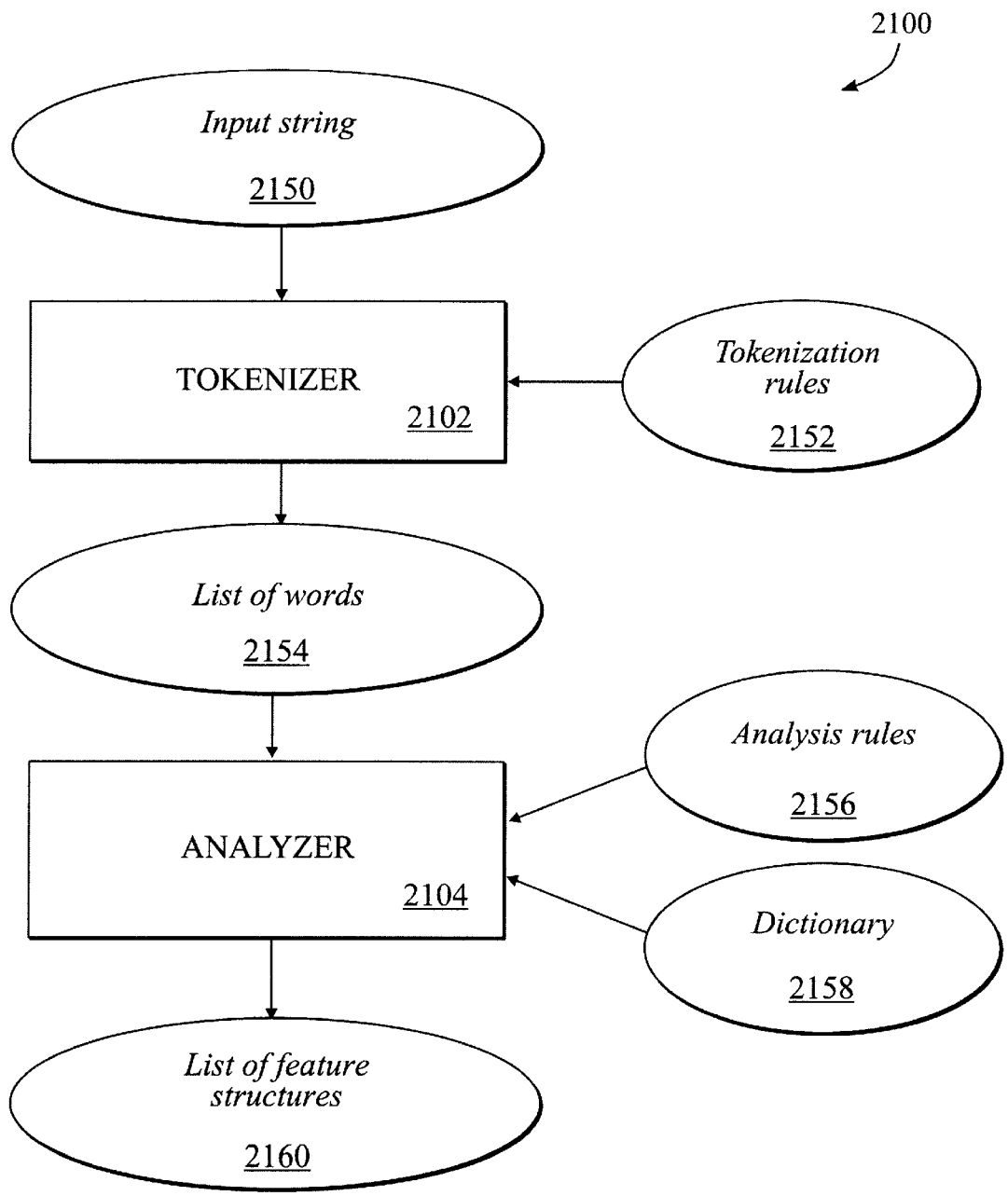
FIG. 21 is an Analyzer for Inflectional Morphology (AIM) of an embodiment of the present invention.

FIG. 21 is an Analyzer for Inflectional Morphology (AIM) 2100 of an embodiment of the present invention. The AIM 2100 comprises two main modules, a tokenizer 2102 and a morphological analyzer 2104, but is not so limited.

The tokenizer 2102 of an embodiment takes an input string 2150 comprising a sequence of words and breaks it into individual tokens 2154 comprising full words, reduced words, numbers, symbols, punctuation characters, but is not so limited. This process examines the local context, or the current character and its immediate neighbors, and uses a small set of tokenization rules 2152. In an embodiment, the tokenizer makes a break at the following places with the corresponding effect, but is not so limited:

space character (space, return, tab, End-of-Sentence (EOS));

apostrophe+space character ("Doris'"->"Doris" "'");

apostrophe+"s" ("Peter's"->"Peter" "'s");

apostrophe+"re" ("they're"->"they" "'re");

apostrophe+"d" ("Peter'd"->"Peter" "'d");

apostrophe+"ve" ("Peter've"->"Peter" "'ve");

apostrophe+"ll" ("Peter'll"->"Peter" "'ll");

period+EOS ("Peter likes fish."->"Peter" "likes" "fish" ".");

question mark ("Does Peter like fish?"->"does" "Peter" "like" "fish" "?");

exclamation mark ("Fish!"->"fish" "!");

comma (except between numbers) ("apples, oranges and bananas"->"apples" "," "oranges" "and" "bananas");

dollar sign ("$30"->"$" "30");

percent sign ("30%"->"30" "%");

plus sign ("+80"->"+" "80");

minus sign (only when followed by a number) ("-3"->"-" "3");

semicolon ("fruits; apples, oranges and bananas"->"fruits" ";" "apples" "," "oranges" "and" "bananas");

colon (except between numbers).

Figure 22:
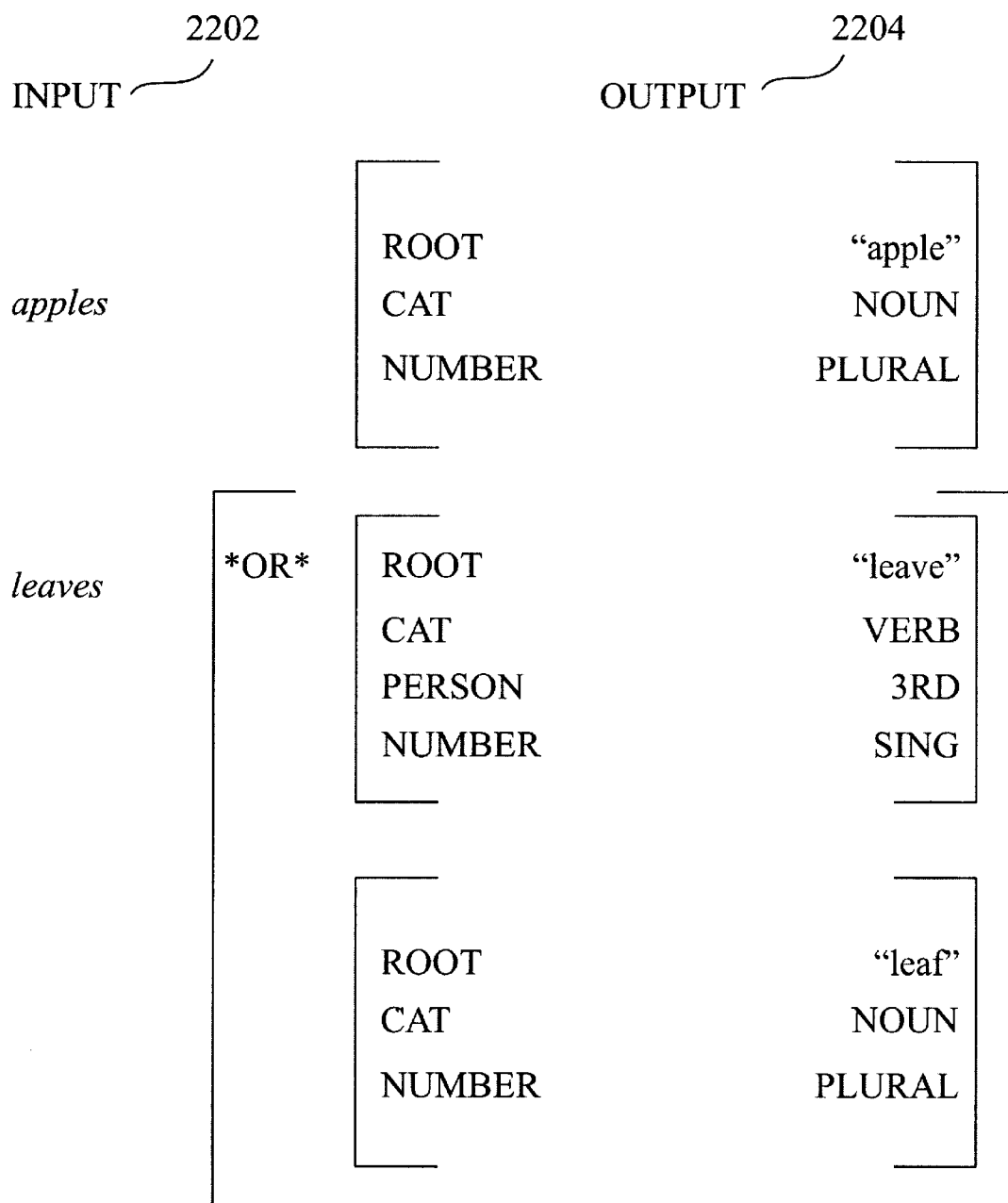
FIG. 22 shows a sample input and output of an AIM of an embodiment of the present invention.

The analyzer 2104 of an embodiment takes the output 2154 from the tokenizer 2102, a sequence of tokens, and analyzes each word by consulting the dictionary 2158 and a set of analysis rules 2156. The dictionaries 2158 comprise lexicons in the format of feature structures. An appropriate feature structure 2160 is constructed for the word, inserting features associated with the inflection type in question. If the token can be analyzed, the feature structure of the token with newly generated morphological features is output. If the analyzer 2104 finds more than one valid analysis of the word, it returns a multiple feature structure; if the analyzer 2104 is unable to find an analysis, it returns a special feature structure for an unknown word. Furthermore, possible splits of the sequence of tokens are determined, and a determination is made as to whether each split is valid. Morphological rules are applied to rule out unwanted splits and to assign proper morphological information to corresponding features. FIG. 22 shows a sample input 2202 and output 2204 of an AIM of an embodiment of the present invention.

Example input and output feature structures of an embodiment of the present invention follow, but the embodiment is not so limited. A first example comprises input and output feature structures that involves no morphological split:

Input string: saw

Lexical f-structure from dictionary:
   a. ((ROOT "see")
      (SURFACE "saw")
      (CAT VERB)
      (TRANS INTRANS)
      (TENSE PAST))
   b. ((ROOT "saw")
      ((CAT NOUN))

Lexical f-structure output by morphological analyzer:
   (*OR* ((ROOT "see")
      (SURFACE "saw")
      (CAT VERB)
      (TRANS INTRANS)
      (TENSE PAST))
      ((ROOT "saw")
      (CAT NOUN))

A second example comprises input and output feature structures for one morphological split:

Input string: studies

Lexical f-structure from dictionary:
   a. ((ROOT "study")
      (CAT NOUN))
   b. ((ROOT "study")
      (CAT VERB)))

Lexical f-structure output by morphological analyzer:
   (*OR* ((ROOT "study")
      (CAT NOUN)
      (NUMBER PLURAL))
      ((ROOT "study")
      (CAT VERB)
      (PERSON 3RD)
      (TENSE PRES)
      (NUMBER SING)))

Input string: studied

Lexical f-structure output by morphological analyzer:
   (*OR* ((ROOT "study")
      (CAT VERB)
      (VFORM PAST-PART))
      ((ROOT "study")
      (CAT VERB)
      (VFORM PAST)))

A third example comprises input and output feature structures for multiple morphological splits:

Input string: leaves

Lexical f-structure from dictionary
   a. ((ROOT "leave")
      (CAT VERB))
   b. ((ROOT "leaf")
      (CAT NOUN))

Lexical f-structure output by morphological analyzer:
   (*OR* ((ROOT "leave")
      (CAT VERB)
      (PERSON 3RD)
      (TENSE PRES)
      (NUMBER SING))
      ((ROOT "leaf")
      (CAT NOUN)
      (NUMBER PLURAL)))

The dictionary format of an AIM of an embodiment of the present invention provides three different types of entries wherein a minimum to a large amount of information may be encoded. Each entry of a dictionary is a lexical feature structure, wherein the data structure of a dictionary is an array with elements comprising a key and a lexical feature structure. The treatment of irregular forms as separate entries in the AIM does not impose much additional burden in terms of the number of entries and complexity, but aids organization and increases usability and ease of maintenance. The sorting of all entries by root feature makes the dictionary easier to organize and maintain and maximizes usability for the purposes of morphological analysis. Furthermore, the AIM dictionary structure makes it easy to add new features to the dictionary entries. Moreover, the dictionary format may be reused for design implementation and usage of a morphological generator.

In evaluating the performance of the AIM of an embodiment, experiments were conducted to compare the AIM and a typical two-level morphological analyzer in terms of speed and memory requirements.

The programs were tested on Sun Ultra 2 workstations using 5000-word dictionaries for both analyzers in the appropriate formats. Speed was tested using a corpus of 11,491 sentences containing 92,379 tokens (words, numbers, punctuation, etc.), including some out-of-vocabulary words. The AIM tokenizer was used to break up each input sentence into tokens before performing the morphological analysis. The results showed the AIM to be approximately 42 times faster than the typical two-level morphological analyzer.

The AIM of an embodiment of the present invention provides for increased overall performance of a speech translation system while providing the necessary and sufficient morphological analysis. As discussed herein, the AIM is fast in that it analyzes the input four times as fast as a typical two level analyzer. The efficiency is significantly improved as the possibility of storing dictionary feature structures in read-only memory (ROM) reduces the amount of random access memory (RAM) required for working memory. Furthermore, there is a possibility of reducing the ROM size by optimizing the feature structure representations.

The features and advantages of an embodiment of the present invention comprise modularity, handling of inflectional morphology, sequential rule application, an output format comprising feature structures with feature value pairs, an improved dictionary format, improved processing speed, reduced memory requirement, and increased overall performance. Regarding modularity, as the AIM is a modular part of the translation system, it can easily be used and integrated into other applications and tools (e.g. for word extraction from large corpora). Regarding the handling of inflectional morphology, an embodiment of the present invention comprises a reduced number of dictionary entries and a reduction in the number of entries in the translation knowledge base. The AIM of an embodiment of the present invention is easy to maintain since the direct correspondence between the transfer knowledge base and the dictionary is preserved. The sequential rule application provides for advantages in that the morphological analysis is faster, less computationally complex, always returns an analysis, provides reliable and accurate performance, and provides for ease of maintenance of rule sets. The output format of the AIM of an embodiment of the present invention makes it easy to integrate the AIM with a syntactic parser which also operates on feature structures. Furthermore, it provides for quick access to relevant individual features (e.g. root, grammatical category).

The AIM of an embodiment of the present invention comprises English morphological rules comprising rules for verbs, rules for nouns, rules for adjectives, rules for adverbs, rules for auxiliaries and modals, rules for determiners, and rules for pronouns.

The rules for verbs of an embodiment comprise default rules, consonant doubling rules, final letter "e" rules, final letter "y" rules, and irregular verb rules, but are not so limited. The verb default rules comprise, but are not limited to, rules that:

add "s" for 3rd person singular, present tense (e.g. to walk –>walks);

add "ed" for simple past and past participle forms (singular and plural) (e.g. to walk –>walked);

add "ing" for present participle forms (e.g. to walk –>walking).

The rules for consonant doubling apply to verbs ending in one of the following consonants immediately preceded by a short vowel. When the rules for consonant doubling apply, the final consonant is doubled for present participle, simple past and past participle forms. If the verb is irregular, consonant doubling should regularly occur for the present participle form. Third person singular verb forms remain unaffected by this rule. Verbs that end in a short vowel plus one of the consonants listed, but do not follow the consonant doubling rule (exceptions and irregular verbs) are not be tagged with this feature in the dictionary. The effects of the consonant doubling rules with examples follow:

"b"–>"bb" (e.g. "stab"; "throb");

"g"–>"gg" (e.g. "flag"; "plug");

"l"–>"ll" (e.g. "cancel"; "dial"; "quarrel"; "refuel"; "travel");

"p"–>"pp" (e.g. "clip"; "drop"; "develop"; "equip"; "gift-wrap"; "rip"; "ship"; "shop"; "slip"; "step"; "stop"; "tip"; "trap"; "wrap");

"r"–>"rr" (e.g. "stir"; "occur");

"n"–>"nn" (e.g. *"run"; *"begin");

"t"–>"tt" (e.g. "bet"; "fit"; "permit"; "vomit"; "cut"; "get"; "hit"; "let"; "put"; "set"; "shut"; "sit"; "upset");

"c"–>"ck" (e.g. "panic").

In an embodiment, verbs that end in "e" immediately preceded by a consonant are handled by the rules as follows, but are not so limited:

3rd person singular, default rule (add "s") applies;

simple past and past participle, drop final "e" and apply default rule (add "ed") (e.g. "hope"–>"hoped"; "like"–>"liked");

present participle, drop final "e" and apply default rule (add "ing") (e.g. "issue"–>"issuing"; "achieve"–>"achieving").

In an embodiment, verbs that end in "y" immediately preceded by a consonant are handled by the rules as follows, but are not so limited:

3rd person singular: change final "y" to "i" and apply default rule (add "s") (e.g. "apply"–>"applies"; "cry"–>"cries");

simple past and past participle: change final "y" to "i" and apply default rule (add "ed") (e.g. "carry"–>"carried"; "fry"–>"fried");

present participle: apply default rule (add "ing").

For irregular simple past and past participle verb forms in an embodiment, three separate dictionary entries will be made, irrespective of whether the three grammatical forms have the same surface form or not, but the embodiment is not so limited (e.g. "bear"–>"bore"/"borne"; "give"–>"gave"/"given"; "put"–>"put"/"put"; "know"–>"known"/"known"; "write"–>"wrote"/"written").

The rules for nouns of an embodiment comprise default rules, zero plural rules, zero singular rules, identical singular and plural form rules, and rules for nouns with particular endings, but are not so limited. The noun default rules comprise, but are not limited to, rules that for:

plural noun, add "s" to root (e.g. "apple"–>"apples");

genitive singular noun, add "'s" to root (e.g. "agent"–>"agent's");

genitive plural noun, add "'" to plural form (e.g. "students"–>"students'").

Regarding the zero plural noun rules, some nouns do not form a plural form (for example: abstracts, examples belonging to certain thesaurus concepts like 'COUNTRY', 'LANG-NAME', 'STYLE') and are marked as such (e.g. "Japan"; "hiking"; "cinnamon"; "advertising").

Regarding the zero singular noun rules, some nouns do not have a singular form and are marked as such. These nouns behave like singular forms (e.g. no article; verb takes a plural form; quantifiers to express number) (e.g. "scissors"; "trousers"; "binoculars"; "clippers").

Regarding the identical singular and plural form noun rules, for some words, plural and singular have identical surface forms, which do behave like regular singular and plural forms (e.g. with respect to verb forms) and have countable instances (e.g. "sheep").

In an embodiment, nouns ending in "ss", "sh", "ch", "x", "o" are handled by the rules as follows, but are not so limited:

plural, insert "e" at the end of the root and apply plural formation default rule (add "s") (e.g. "wish"; "dress"; "fox"; "tomato");

genitive singular of proper nouns (mainly person names), add "'" after root (e.g. "Doris"–>"Doris'");

genitive singular of all other nouns, add "es" after root (e.g. "fox"->"foxes").

The rules for adjectives of an embodiment comprise default rules, rules for adjectives ending in "e", rules for adjectives ending in "y", rules for consonant doubling, and rules for irregular adjectives, but are not so limited. The adjective default rules comprise, but are not limited to, rules that for:

adverb formation, add "ly" to adjectives that can form an adverb (e.g. "warm"->"warmly") [alternatively, the default rule could be the absence of the adverb formation feature, in which case, the ability to form an adverb by adding "ly" would have to be marked for the respective entries];

comparative forms, add "er" to root (e.g. "calm"->"calmer");

superlative forms, add "est" to root (e.g. "late"->"latest");

In an alternate embodiment, an alternative set of adjective default rules may be used for comparative/superlative forms, wherein the alternative set of adjective default rules comprise, but are not limited to, rules that for:

comparative forms, add separate word "more" in front of root (e.g. "expensive"->"more" "expensive");

superlative forms, add separate word "most" in front of root (e.g. "amazing"->"most" "amazing").

The rules for adjectives ending in "e" comprise, but are not limited to, rules for:

comparative forms, drop final "e" and apply default rule (add "er") (e.g. "close"->"closer");

superlative forms, drop final "e" and apply default rule (add "est") (e.g. "blue"->"bluer").

The rules for adjectives ending in "y" comprise, but are not limited to, rules for:

comparative forms, change "y" to "i" and apply default rule (add "er") (e.g. "tidy"->"tidier");

superlative forms, change "y" to "i" and apply default rule (add "est") (e.g. "happy"->"happiest").

The adjective rules for consonant doubling comprise, but are not limited to, rules for monosyllabic adjectives ending in "g", "t" or "n" that double the final consonant for the comparative and superlative form (e.g. "hot"->"hotter"/"hottest"; "big"->"bigger"/"biggest"; "thin"->"thinner"/"thinnest").

The rules for irregular adjectives comprise, but are not limited to, rules wherein the following adjectives have irregular comparative and superlative forms which should have separate dictionary entries:

"good"->"better", "best";

"bad"->"worse", "worst";

"far"->"farther"/"further", "farthest"/"furthest";

"old"->"elder", "eldest".

The rules for adverbs of an embodiment comprise default rules and rules for irregular adverbs, but are not so limited. The adverb default rules comprise, but are not limited to, rules that for:

comparative forms, add separate word "more" in front of root (e.g. "secretly"->"more" "secretly");

superlative forms, add separate word "most" in front of root (e.g. "generously"->"most" "generously").

The rules for irregular adverbs comprise, but are not limited to, rules wherein:

some adverbs build the comparative and superlative form by adding "er" or "est" respectively to the root (e.g. "fast"->"faster"/"fastest");

some adverbs have irregular comparative and superlative forms that are not derived by adding "er" or "est" (e.g. "well"->"better/"best").

The morphological rules of an embodiment of the present invention treat auxiliaries and modals as irregular verbs, but the embodiment is not so limited.

The morphological rules of an embodiment of the present invention specify which determiners can take numbers or articles (e.g. "lot"->"a lot"; "dozen"->"two dozen"), but the embodiment is not so limited.

The rules for pronouns comprise, but are not limited to, rules wherein:

personal pronouns, mark for gender (male, female), case (genitive, accusative), number (singular, plural) and person (1st, 2nd, 3rd);

wh-pronouns, mark for case where appropriate.

FIG. 23 is a list of the inflection types 2302 handled by an English morphological analyzer of an embodiment of the present invention. FIG. 24 is a list of top level features 2402 to indicate special inflections in an English morphological analyzer of an embodiment of the present invention. Those regular inflections that require a special rule to analyze inflections are marked at the top level of each lexical entry with the features shown in FIG. 24.

As discussed herein, an embodiment of the present invention comprises a powerful parser for natural language. A parser is a software module that takes as input a sentence of a language and returns a structural analysis, typically in the form of a syntax tree. Many applications in natural language processing, machine translation, and information retrieval require a parser as a fundamental component. The parser of an embodiment of the present invention is used for speech-to-speech translation and integrates feature structure manipulations into a GLR parsing algorithm by introducing a flexible representation and a safe ambiguity packing mechanism. The feature structure unifications are invoked when a new parse node is created. A sentential feature structure is associated with the root node of packed forest. The feature structure constraints of an embodiment are performed when a reduce operation is executed, but the embodiment is not so limited. The parser of an embodiment has advantages over typical parsers, in that it provides for flexible feature structure representation and complete manipulation. Furthermore, the parser provides for safe local ambiguity packing with feature structures in a parse forest.

Figure 25:
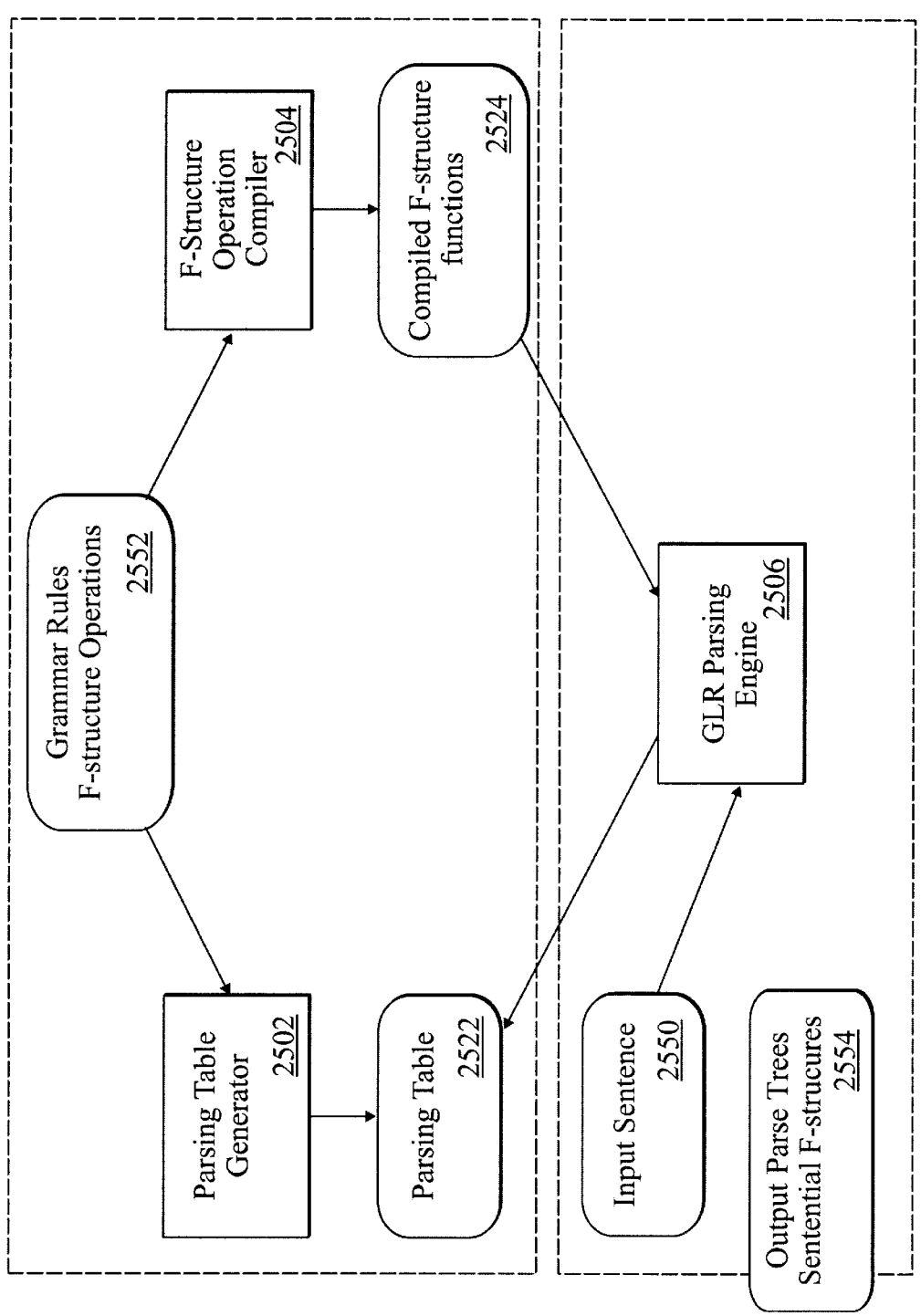
FIG. 25 is a parser implementation of an embodiment of the present invention.

FIG. 25 is a parser implementation of an embodiment of the present invention. The parser comprises an parsing table generator 2502, a feature structure (F-structure) operation compiler 2504, and a GLR parsing engine 2506 with feature structure constraint application. The parsing table generator 2502 receives an input comprising a set of grammar rules bundled with or annotated with feature structure manipulations or operations 2552. The grammar rules of an embodiment comprise English parsing grammar rules and Japanese parsing grammar rules, and the grammar rules may comprise context-free grammar rules, but are not so limited. The parsing table generator takes the grammar rules and creates a data structure that encodes the operations of the parser. The data structure controls the parser in the performance of a set of operations, wherein the set of operations comprises a reduce action, a shift action, an accept action, and a fail action, but is not so limited. The parsing table generator 2502 provides an output comprising a parsing table 2522 that is stored as a file in an embodiment.

The feature structure operation compiler 2504 receives an input comprising a set of grammar rules bundled with feature structure manipulations or operations 2552. The feature structure operation compiler 2504 takes the feature structure operations or annotations comprising high-level instructions in a programming language and compiles them into other functions in a programming language source code. The feature structure operation compiler 2504 provides an output comprising C language source code for the compiled feature structure functions 2524, but is not so limited.

The feature structure functions 2524 are compiled and linked with the GLR parsing engine 2506. The GLR parsing engine 2506 also consults the parsing table 2522. The parsing engine 2506 operates on the input sentences 2550 to provide an output 2554 comprising parse trees and sentential feature structures. The integration of feature structures and the parsing engine follows the augmented GLR algorithm of an embodiment of the present invention.

The feature structure operation compiler 2504 of an embodiment converts feature structure grammar into a C program which is compiled again by a C compiler and linked to the modules of the GLR parsing engine 2506. It takes an input comprising a set of grammar rules bundled with feature structure manipulations or operations 2552. It converts the feature structure manipulations or operations to instructions in a programming language, such as a C program. Formal variables are replaced by expressions that represent references to the appropriate memory locations at parser run-time.

Figure 26:
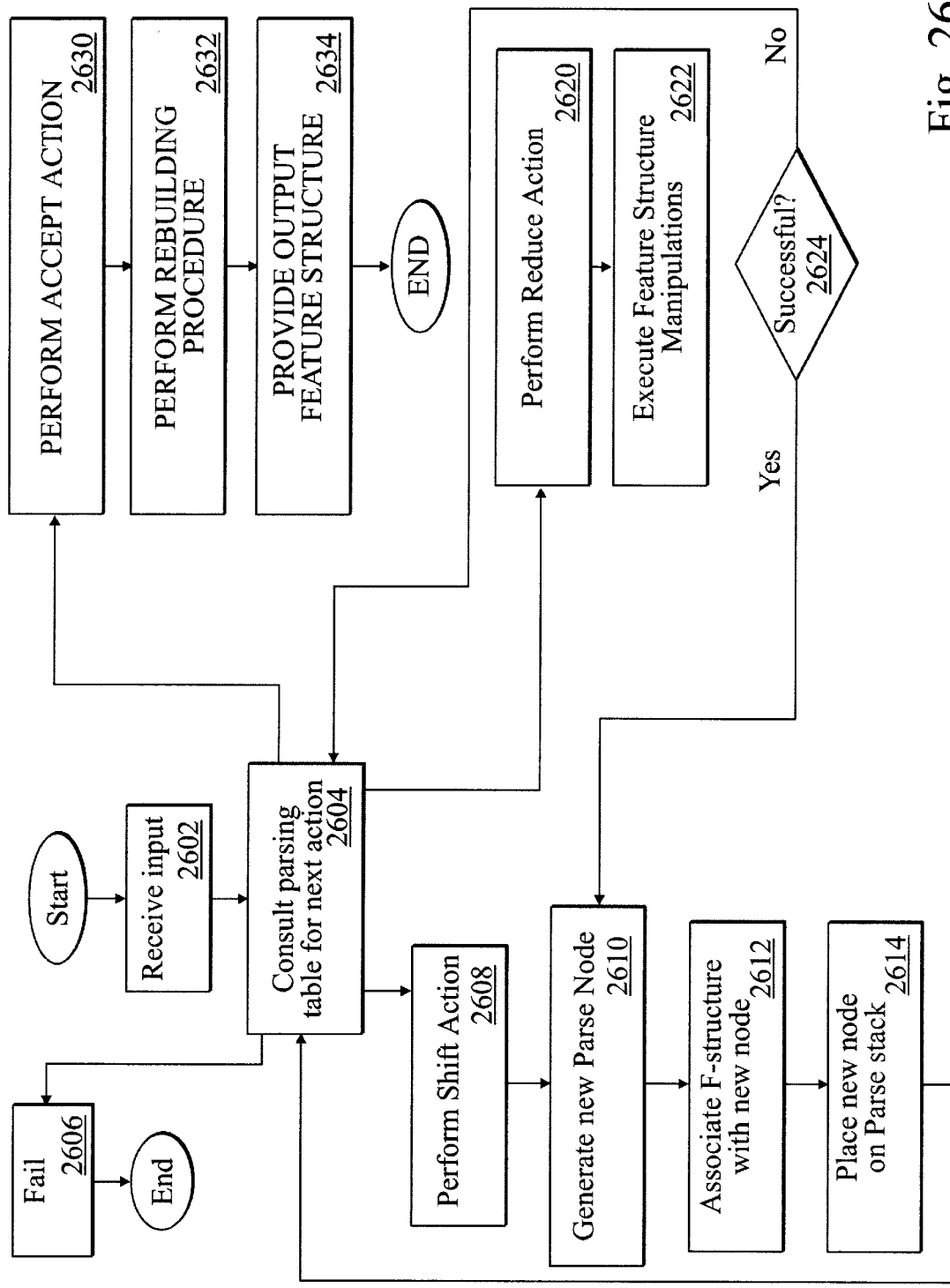
FIG. 26 is a flowchart for a method of parsing in a spoken language translation system of an embodiment of the present invention.

FIG. 26 is a flowchart for a method of parsing in a spoken language translation system of an embodiment of the present invention. Operation begins at step 2602, at which at least one input is received comprising at least one input sentence or expression. At step 2604, the parsing table is accessed and consulted for a next action, wherein the parser looks up in the next action in the parsing table, but is not so limited. If the parser is unable to analyze the input, the next action is a fail action and operation continues at step 2606, at which the analysis stops. During parsing operations, the parser may perform shift actions and reduce actions, but is not so limited.

If the next action is determined to be a shift action at step 2604, operation continues at step 2608, at which a shift action is performed. The shift action shifts onto a stack or intermediate data structure of the parser the next item of the input string. The stack or intermediate data structure of an embodiment comprises at least one graph-structured stack that is maintained. The stack comprises at least one parsing state, and at least one representation of each input word is shifted onto the at least one graph-structured stack. A new parse node is generated, at step 2610. A feature structure or lexical feature structure of the shifted input item is obtained from the morphological analyzer and associated with the new parse node, at step 2612. At step 2614, the new node is placed on the stack or intermediate data structure, and operation continues at step 2604, at which the parsing table is consulted for a next action.

If the next action is determined to be a reduce action at step 2604, operation continues at step 2620, at which a reduce action is performed. The reduce action corresponds to the application of at least one grammar rule from the set of grammar rules, so that the reduce action comprises accessing and applying the compiled feature structure manipulations or functions that are associated with the applied grammar rule, but the embodiment is not so limited. At step 2622, the feature structure manipulations are executed. A determination is made, at step 2624, whether the manipulations fail or succeed. If the manipulations fail then application of the rule fails, and operation continues at step 2604, at which the parsing table is consulted for a next action. If the manipulations succeed, operation continues at step 2610, at which a new parse node is generated comprising the new feature structures resulting from the successful feature structure manipulations.

When the parser has analyzed the entire input successfully and generated at least one packed shared parse forest, the next action is an accept action, and operation continues at step 2630, at which the accept action is performed. At step 2632, a rebuilding procedure is performed on the context-free tree structure of the input sentence generated by the parser. The output feature structure is provided, at step 2634, wherein the output comprises a structural analysis of the input. The structural analysis of an embodiment comprises a plurality of parse trees and sentential feature structures, but is not so limited.

The parsing of an embodiment of the present invention comprises the performance of safe local ambiguity packing and the recursive rebuilding of the at least one feature structure. The step of recursively rebuilding comprises marking each of the nodes for which the feature structures are to be rebuilt. At least one log is maintained comprising each of the nodes for which the feature structure is to be rebuilt. The farthermost marked node from the root node is located, when traversing at least one branch path of the packed shared parse forest. Once located, the feature structure of the farthermost marked node is rebuilt. The feature structures of each marked node in succession along the branch path between the farthermost marked node and the root node are rebuilt, and the root node feature structures are rebuilt.

Figure 27:
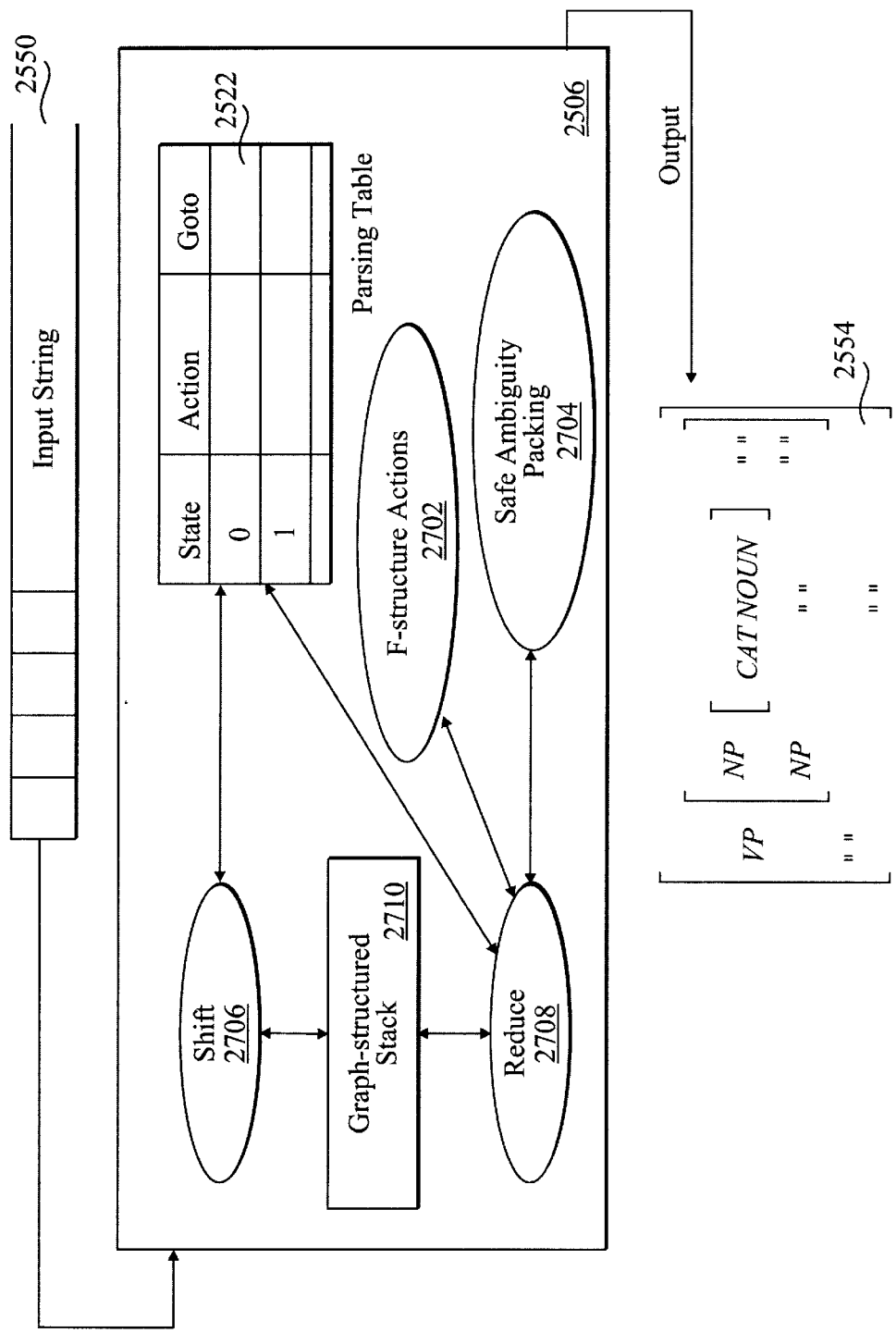
FIG. 27 is a parsing engine of an embodiment of the present invention.

FIG. 27 is a parsing engine 2506 of an embodiment of the present invention. The parsing engine 2506 comprises feature structure actions 2702 and safe ambiguity packing 2704, but is not so limited. Moreover, the parsing engine 2506 comprises a graph-structured stack 2710 as a general device for efficient handling of nondeterminism in the stack. In an embodiment, the data structure of a parse node in the packed forest is augmented to be associated with a feature structure, but is not so limited. The feature structure can be generated either in shift action 2706 or reduce action 2708, but the embodiment is not so limited. When a shift action 2706 is performed, a new parse node is created for the new shifted symbol. The feature structure of this parse node is created by copying the feature structure lexicon. When a reduce action 2708 is performed, the set of feature structure actions associated with the reduce action is performed first. If none of the feature structure actions indicates failure, then a new parse node is created and associated with the resulting feature structure. Otherwise the current reduction fails. If a parse node is a packed node, which means that a local ambiguity packing happened, then a disjunctive feature structure is used to represent the packed ambiguities.

In a typical GLR parser, in which the root node is a packed node and the feature structure of the root node 2554 is the final output of the parsing, local ambiguity packing is used to save storage for parse trees. However, the typical GLR parser has a problem in that, if new ambiguity packing occurs on another packed node, the feature structure of the root node will not typically reflect the changes, so that the final output of the parsing may be incorrect.

The safe ambiguity packing 2704 of an embodiment of the present invention comprises retaining log information during parsing, and rebuilding the feature structure of nodes as needed when parsing is finished, but is not so limited. In retaining log information, the original data structure of a parse node is augmented to incorporate log information that indicates how the feature structure of the parse node has been constructed. Furthermore, an updated node list or link list is maintained during parsing to store the nodes having updated feature structures. The check for updated nodes is performed upon local ambiguity packing. The ancestors of an updated node should be rebuilt to reflect the new changes. Consequently, all nodes that need to be rebuilt in the parse tree are marked. When entering the rebuild stage, the rebuild procedure begins at the root of the parse tree and recursively searches for marked nodes. Marked nodes, when found, are rebuilt. The feature structure of the root node is rebuilt at the end.

Thus, a method and apparatus for a spoken language translation system have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a language translation system, a method for providing a guide for a user, comprising:
   receiving an input that is representative of at least one word in a source language;
   generating at least one recognition hypothesis in the source language in response to the input;
   determining a best hypothesis from the at least one recognition hypothesis in the source language;
   presenting the best hypothesis in the source language to a user;
   presenting alternatives to a portion of the best hypothesis in the source language to the user;
   receiving an indication of a choice of one of the alternatives from the user; and
   presenting a revised version of the best hypothesis including the alternative chosen to the user.

2. The method of claim 1, further comprising:
   receiving an acceptance of the revised version of the best hypothesis in the source language; and
   presenting an output that is representative of the revised version of the best hypothesis in a target language.

3. The method of claim 1, wherein the best hypothesis in the source language is a group of words in the source language, and wherein the portion of the best hypothesis in the source language is a subgroup of the group of words.

4. The method of claim 3, wherein, when multiple subgroups exist, a largest subgroup is used as the portion of the best hypothesis in the source language.

5. The method of claim 4, further comprising receiving a correction of the portion of the best hypothesis in the source language.

6. The method of claim 5, further comprising:
   storing the correction; and
   using the correction to generate a best hypothesis in the source language in response to a subsequent input that is similar to the input.

7. The method of claim 1, wherein the input received is spoken words.

8. The method of claim 1, wherein the input received is an output of a keyboard device.

9. The method of claim 1, wherein the input received is an output of a handwriting recognition process.

10. The method of claim 1, wherein the input received is an output of an optical character recognition (OCR) process.

11. The method of claim 1, wherein the input received is an output of one of a group comprising a handwriting recognition process and an optical character recognition (OCR) process.

12. The method of claim 1, wherein presenting comprises displaying words on a display device.

13. In a language translation system, a method for providing a guide for a user, comprising:
   receiving an input that is representative of at least one word in a source language;
   generating at least one recognition hypothesis in the source language in response to the input;
   generating at least one recognition hypothesis in a target language in response to the input;
   presenting the at least one recognition hypothesis in the source language and the at least one recognition hypothesis in a target language as a list of pairs ordered according to likelihood of being correct;
   accepting a choice of one pair of the list of pairs from a user, wherein a chosen pair comprises a best hypothesis in the source language and a best hypothesis in the target language;
   indicating a portion of the best hypothesis in the source language to the user, wherein the portion has at least one alternative expression;
   presenting the at least one alternative expression to the user;
   accepting a choice of one of the at least one alternative expressions; and
   presenting the best hypothesis, including the chosen alternative, to the user in the source language; and
   presenting the best hypothesis, including the chosen alternative, to the user in the target language.

14. The method of claim 13, further including accepting a confirmation of the best alternative with the chosen alternative from the user.

15. The method of claim 13, further including:
   accepting a correction to the portion of the best hypothesis in the source language;
   presenting the best hypothesis including the correction in the source language to the user; and
   presenting the best hypothesis including the correction in the target language to the user.

16. The method of claim 15, wherein presenting comprises displaying on a display device.

17. The method of claim 15, wherein the input comprises spoken words.

18. The method of claim 15, wherein the input received is an output of a keyboard device.

19. The method of claim 15, wherein the input received is an output of a handwriting recognition process.

20. The method of claim 15, wherein the input received is an output of an optical character recognition (OCR) process.

21. In a language translation system, an interactive method for translating a group of words, comprising:
   receiving an input that represents the group of words in a source language;
   displaying at least one candidate hypothesis to the user, wherein the at least one candidate hypothesis comprises:
      a source language representation of the group of words in the source language that is based upon a translation module's understanding of the input;
      a target language representation of the group of words in a target language that is based upon the translation module's interpretation of the source language representation; and a source language representation of a back-translation of the target language representation of the group of words.

22. The method of claim 21, further comprising accepting an indication from the user of a best hypothesis of the at least one candidate hypotheses.

23. The method of claim 22, further comprising:

indicating a subgroup of words in a source language representation portion of the best hypothesis, wherein there are alternative source language representations for the subgroup; and displaying at least one alternative source language representation of the subgroup.

24. The method of claim 23, further comprising:

accepting an indication of a chosen alternative of the at least one alternatives from the user; and displaying a revised best hypothesis, comprising:

a source language representation of the group of words, including the chosen alternative source language representation of the subgroup;

a target language representation of the group of words, including the translation module's interpretation of the chosen alternative source language representation of the subgroup; and a source language representation of a back-translation of the target language representation of the group of words.

25. The method of claim 24, further comprising receiving an indication from the user that the revised best hypothesis is acceptable.

26. The method of claim 23, further comprising accepting an edited version of the subgroup of words in the source language representation portion of the best hypothesis from the user.

27. A computer readable medium containing executable instructions which, when executed in a processing system, cause the system to perform a method for performing language translation, the method comprising:

receiving an input that is representative of at least one word in a source language;

generating at least one recognition hypothesis in the source language in response to the input;

selecting a best hypothesis from the at least one recognition hypothesis in the source language;

presenting the best hypothesis in the source language to a user;

presenting alternatives to a portion of the best hypothesis in the source language to the user;

receiving an indication of a choice of one of the alternatives from the user; and presenting a revised version of the best hypothesis including the alternative chosen to the user.

28. The method of claim 27, further comprising:

receiving an acceptance of the revised version of the best hypothesis in the source language; and presenting an output that is representative of the best hypothesis in a target language.

29. The method of claim 27, wherein the best hypothesis in the source language is a group of words in the source language, and wherein the portion of the best hypothesis in the source language is a subgroup of the group of words.

30. The method of claim 29, wherein, when multiple subgroups exist, a largest subgroup is used as the portion of the best hypothesis in the source language.

31. The method of claim 30, further comprising receiving a correction of the portion of the best hypothesis in the source language.

32. The method of claim 31, further comprising:

storing the correction; and using the correction to generate a best hypothesis in the source language in response to a subsequent input that is similar to the input.

33. The method of claim 27, wherein the input received is spoken words.

34. The method of claim 27, wherein the input received is an output of a keyboard device.

35. The method of claim 27, wherein the input received is an output of a handwriting recognition process.

36. The method of claim 27, wherein the input received is an output of an optical character recognition (OCR) process.

37. The method of claim 27, wherein presenting comprises displaying words on a display device.

38. The method of claim 27, wherein the display device is a touch-sensitive screen, and wherein receiving an indication of a choice of one of the alternatives from the user is a consequence of the user touching the touch screen.

39. The method of claim 37, wherein presenting alternatives to a portion of the best hypothesis in the source language to the user includes displaying a number associated with each alternative, and wherein receiving an indication of a choice of one of the alternatives from the user is a consequence of the user pressing a number on a keyboard device coupled to the display device.

* * * * *